United States Patent [19]

Logemann, Jr. et al.

[11] 3,847,394

[45] Nov. 12, 1974

[54] BOWLING PIN DETECTOR

[75] Inventors: Hugo Logemann, Jr., Concord; Donald Francis Dion, Burlington, both of Mass.

[73] Assignee: RCA Corporation, New York, N.Y.

[22] Filed: Dec. 26, 1972

[21] Appl. No.: 318,550

[52] U.S. Cl. .......... 273/54 E, 250/222 R

[51] Int. Cl. .......... A63d 5/04

[58] Field of Search ..... 273/54 C, 54 E; 250/222 R, 250/222 PC, 217 CR

[56] References Cited

UNITED STATES PATENTS

| | | | |
|---|---|---|---|
| 3,140,872 | 7/1964 | Bolger | 273/54 E |
| 3,295,849 | 1/1967 | Miller et al. | 273/54 C |
| 3,307,848 | 3/1967 | Brackett et al. | 273/54 E |
| 3,408,485 | 10/1968 | Scott et al. | 250/217 CR |
| 3,651,328 | 3/1972 | Hutto et al. | 273/54 E X |

*Primary Examiner*—Anton O. Oechsle
*Attorney, Agent, or Firm*—Edward J. Norton; William Squire

[57] ABSTRACT

A bowling pin detector illuminates all standing pins in a ten pin bowling game to produce a separately identifiable pin image for each pin regardless of the position of the pins with respect to each other. These pin images are sensed by a high resolution photosensitive surface such as exists in a video camera. The video output of the photosensitive surface is processed to generate a pin signal corresponding to each standing pin. To identify detected pins, the field of view is divided into pin identifying regions. The apparatus is programmed to associate each detected pin to a pin identifying region when the detected pin image for that pin falls within that region. Total pin count only is provided when more than one pin is standing in the same pin identifying region.

33 Claims, 20 Drawing Figures

PATENTED NOV 12 1974

3,847,394

SHEET 03 OF 10

TRUTH TABLE LATCH 200

| 201 | 202 | 205 | 203 |
|---|---|---|---|
| 0 | 0 | 1 | 1 |
| 0 | 1 | 1 | 0 |
| 1 | 0 | 0 | 1 |
| 1 | 1 | INDETERMINATE REMAINS IN PREVIOUS STATE | |

TRUTH TABLE CIRCUIT 92

| B | C | 201 | 202 | 203 |
|---|---|---|---|---|
| 0 | 0 | 1 | CLOCK | 1 |
| 1 | 0 | 1 | 1 | 1 |
| 0 | 1 | 1 | 1 | 1 |
| 1 | 1 | 0 | 1 | 0 |
| 0 | 1 | 1 | 1 | 0 |

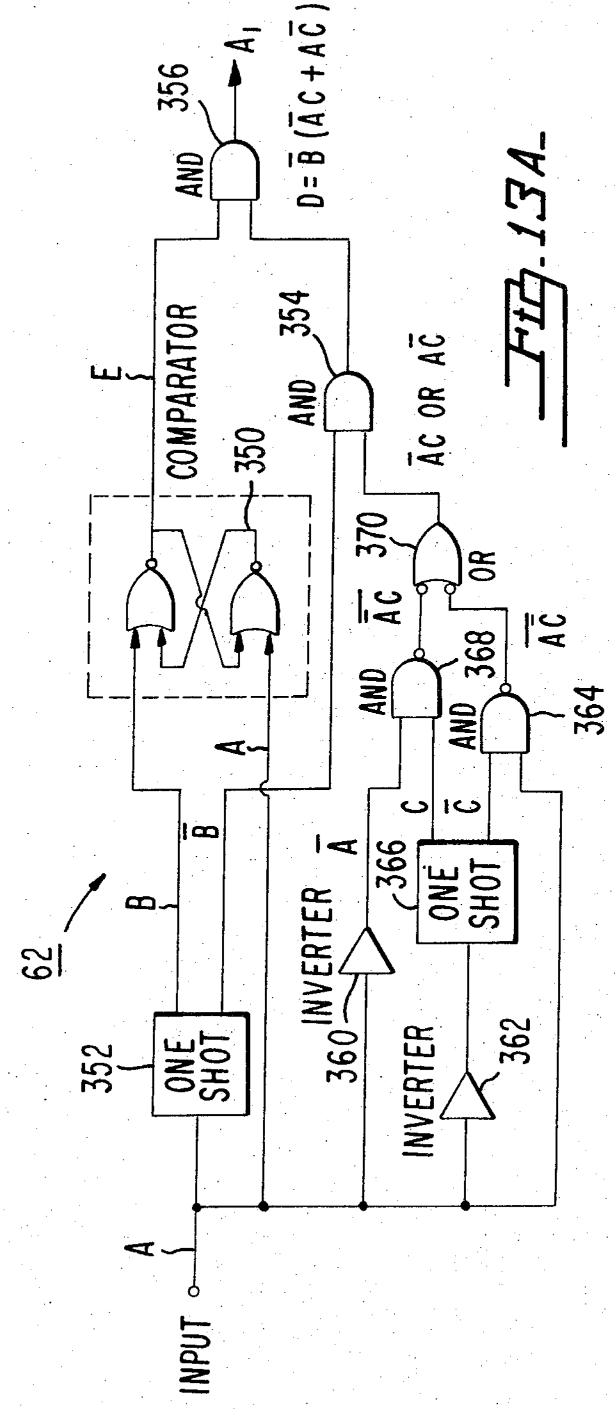
FIG. 13A
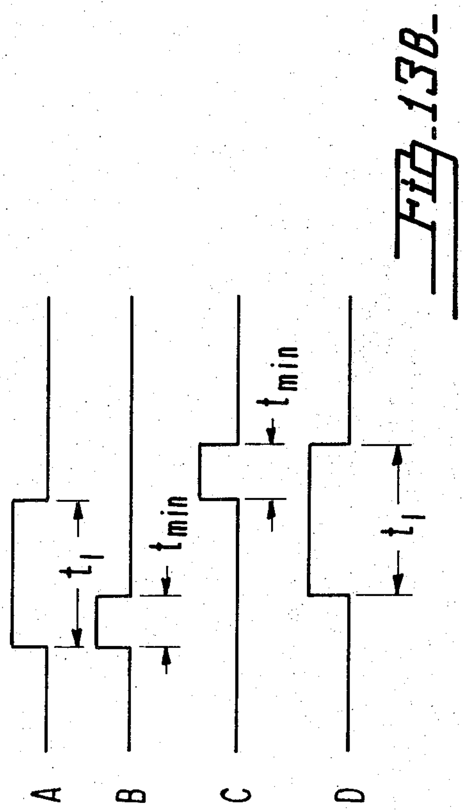
FIG. 13B
| COMPARATOR | | |
|---|---|---|
| A | B | C |
| 0 | 1 | 0 |
| 1 | 0 | 1 |
| 1 | 1 | 0 |
| 0 | 0 | REMAINS PER PREVIOUS STATE |
FIG. 13C

BOWLING PIN DETECTOR

BACKGROUND OF THE INVENTION

In electro-optic bowling pin sensing devices, the presence of standing pins is detected by photo-detector cells or the like which are responsive to images of the standing pins as light is reflected from the pins. In these electro-optic systems it would be most desirable to place the detecting system directly overhead above the pins to view the pins in a plan view to provide a field of view having maximum pin separation, and thus, discrimination, between pins. However, this is not practical with present pin setting apparatus which occupies the space directly above the pins. Additional restrictions on placement of optical pin detecting apparatus on an alley include maintaining a clear view of the pins from the front for a bowler on that alley. These restrictions result in viewing the pins from an angle wherein the pins are partially obscured behind each other. To provide pin discrimination, these systems utilize light zoning techniques wherein the bowling pins are illuminated in a given time sequence. A photocell detector is synchronized with the illuminating sequence to identify the separate pins.

Usually each cell is capable of detecting more than one pin but is restricted from so doing by the zoning of the light. This is accomplished by flashing a beam of light in predetermined zoning areas over the pin deck such that a pin image produced when a given beam of light is flashed corresponds to a given pin when a particular photocell receives that pin image. Lenses or other optical devices are placed adjacent the photodetector cells for collecting the light from each of the zones to concentrate the reflected light onto the photodetector cells. Hence a pin or pins standing in any portion of a given zone will be noted as one pin. Therefore, should a pin be displaced from its set position to a position in which it is adjacent a second pin in a given zone, the light reflected from the two pins will be detected by the same photocell and will be counted as a single pin. Since the apparatus has no way of knowing that a pin has been displaced, an erroneous pin count will be made. Additionally, these systems may record two counts when one pin is midway between the zones defined by two cells or the pin may not be counted at all. Thus, present electro-optical pin fall detection apparatus has proved less than completely satisfactory for automatic bowling scoring systems.

In the present invention, these problems are overcome by so illuminating the pins that a separately identifiable pin image is produced for each standing pin regardless of the position of any of the pins in the field of view including the position where several of the pins may be almost directly behind each other in a line of sight. A photosensitive surface and associated optics as provided by a video television camera are positioned to define the field of view. The scanning beam of the camera can be considered to divide the photosensitive surface into a grid of photosensitive elements. These elements are smaller than the smallest pin image received by the photosensitive surface and are spaced so that every pin image disposed anywhere within the field of view may be detected. Where a plurality of so-called photosensitive elements respond to the same pin image, the response of these elements is processed to form a single standing pin for that image. Additionally, the field of view is divided into a plurality of pin identifying regions. Whenever one single pin image appears in a given pin identifying region, the apparatus is programmed to identify the pin signal associated with that region in which the image appears. For example, a pin is identified as a ONE PIN when the image for that pin appears in the ONE PIN region, the regions being divided into ten regions as used in the ten pin bowling game. Where two pins appear in the same region, the apparatus will detect and count each pin but is programmed to provide only pin count and will not identify any of the pins as such identification will be erroneous for at least the displaced pin.

SUMMARY OF THE INVENTION

In accordance with the present invention an apparatus is provided for detecting each of a plurality of standing bowling pins disposed in an array in a given field of view. The apparatus includes illuminating means for simultaneously illuminating the same given portion of each standing pin of a bowling game disposed anywhere in a given field of view. Pin detecting means are disposed to receive the images of the illuminated pin portions and are responsive to the received images for detecting the presence of each pin standing in the field of view. The pin detecting means generates a standing pin signal for each standing pin.

A feature of the invention includes standing pin identifying means coupled to the pin detecting means for generating a pin identifying signal for each standing pin detected by the detecting means in accordance with the pin position of the detected pin standing in the fiele of view.

The apparatus further includes as an additional feature inhibit means coupled to the pin detecting means for inhibiting the identification of all the standing pins when at least two standing pin signals are identified by the same pin region identifying signal.

IN THE DRAWINGS

FIG. 1 is a diagrammatic plan view of a portion of a bowling alley showing the bowling pins in position before the ball is rolled, the pin illuminators and the position of a TV camera in accordance with a preferred embodiment of the present invention, FIG. 2 is a diagrammatic side elevational view of a portion of a bowling alley of FIG. 1 showing the elevational position of the illuminators and the TV camera.

FIG. 3 is a diagrammatic representation of the field of view of the video camera of FIGS. 1 and 2 wherein pin identifying regions are defined by predetermined portions of the horizontal sweeps and vertical scans of the camera, FIG. 4 is a diagrammatic representation of a preferred embodiment of an apparatus constructed and operated to detect standing pins in accordance with the present invention, FIG. 5 is a preferred embodiment of the apparatus of FIG. 4, FIG. 6 is a timing diagram useful in explaining the operation of the apparatus of FIG. 5, FIG. 7 is a table of video conditions by which standing pins are detected by the apparatus of FIG. 5, FIGS. 8 and 9 are illustrations of the pin images generated by the apparatus of FIG. 5 as depicted on a TV monitor useful in explaining the operation of the apparatus of FIG. 5, FIGS. 10*a*, 10*b* and 10*c* are a preferred embodiment of a detailed circuit and accompanying truth tables for the logic circuit of the single pin detector of FIG. 5, FIG. 11 is a timing diagram useful in explaining the operation of the circuit of FIG. 10*a*, FIGS. 12*a* and 12*b* are exemplary circuit diagrams of pin area decoders, FIGS. 13*a*, 13*b* and 13*c* are a detailed circuit diagram and accompanying truth tables for the minimum pulse width discriminator of FIG. 5, FIG. 14 is a detailed circuit diagram of the standing pin determining means of FIG. 5, and FIG. 15 is a perspective, partial fragmentary view of an illuminator used with the apparatus of FIG. 5.

DETAILED DESCRIPTION

Figure 1:
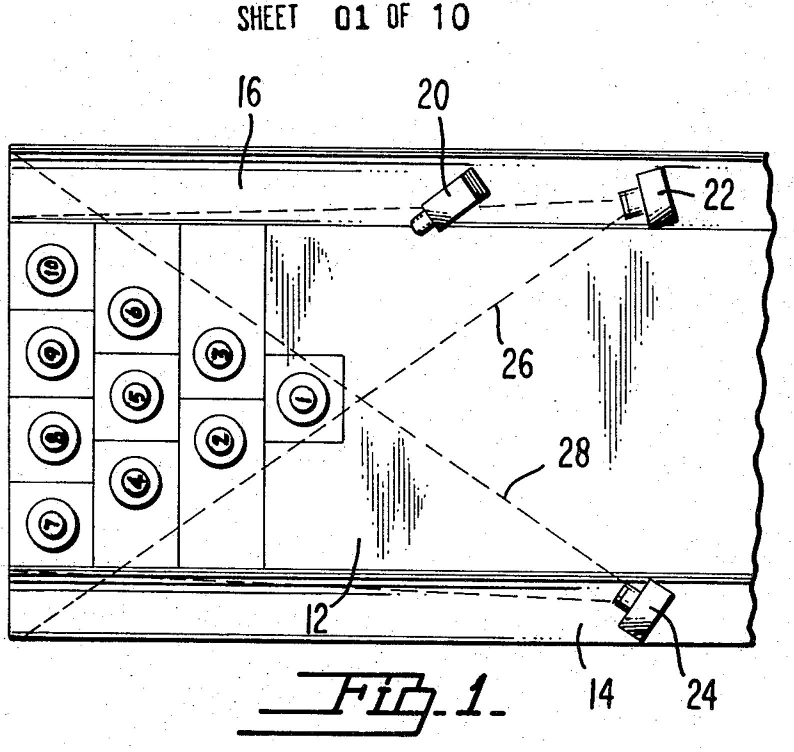
Figure 2:
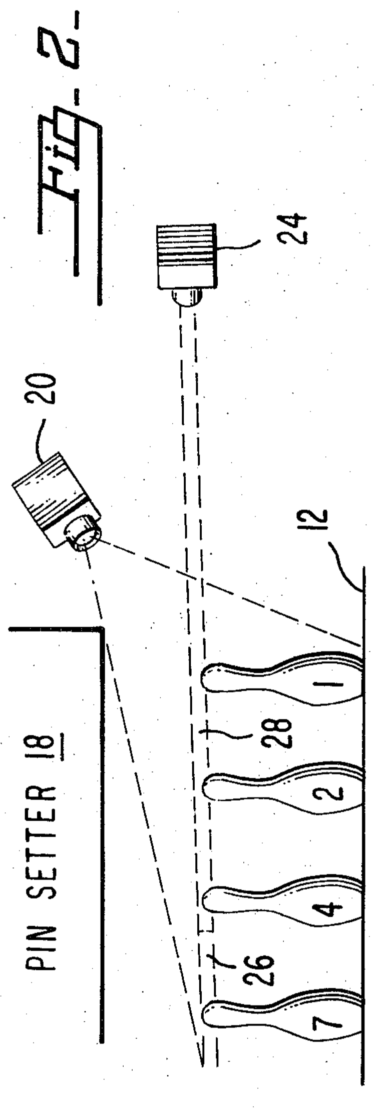

FIGS. 1 and 2 show a portion of a bowling alley in which pins numbered 1 to 10 in a conventional manner are positioned on a pin receiving deck 12 of the alley between two gutters 14 and 16. An automatic pin setting apparatus 18 is disposed above the pins, as shown. In FIGS. 1 and 2 the right hand side of the drawing nearest the ONE PIN will be considered the front or forward end of the alley and the left hand side of the drawing nearest the SEVEN through TEN pins will be considered as the rearward portion of the alley.

Figure 15:
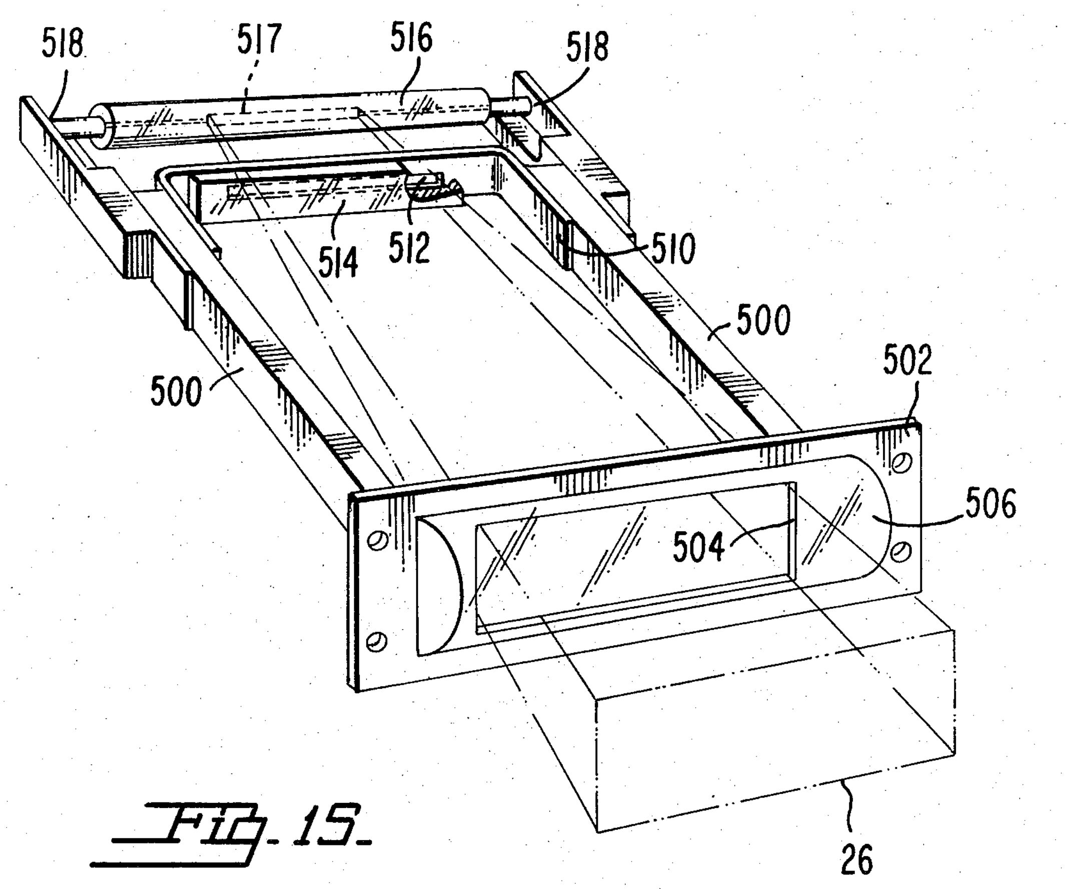

Disposed above the tops of the pins, forward of pin setter 18 and adjacent gutter 16, is TV camera 20 which is pointed downwardly so as to have a field of view which encompasses all of the pins standing anywhere in a playing area to be defined. Two identical fan beam illuminators 22 and 24, to be described in conjunction with FIG. 15, are each placed forward of the TV camera and on separate sides of the alley respectively adjacent gutters 16 and 14. Illuminators 22 and 24 illuminate the tops of the pins in narrow, collimated planar fan beams of filtered light indicated in FIGS. 1 and 2 in phantom as beams 26 and 28, respectively. The illuminators are spaced just slightly above the tops of the pins and aimed at a slight downward angle toward the pins so as to together envelop the entire standing pin area portion of deck 12 at a height just below and above the tips of the heads of all standing pins positioned anywhere on deck 12 in which the pins are to be detected.

In FIG. 1 each pins is enclosed by an imaginary envelope which defines the pin identifying region for that respective pin in accordance with the requirements of the American Bowling Congress. Hereinafter, pin identifying region ONE will be that envelope enclosing the ONE PIN. Identification of each of the pin regions of the respective other pins will be made in a similar manner. A pin standing outside of the pin identifying regions is not counted as a standing pin. The sides of the envelope for pins 3, 6 and 10 terminate in gutter 16 and the sides of the envelope for pins 2, 4 and 7 terminate at gutter 14. The rear of the envelope for pins 7–10 terminate at the rear edge of deck 12.

Additionally, should two pins stand in the same pin identifying region, these pins lose their identification since only one pin number can be associated with any given pin. Thus, if the FOUR PIN slid over into the FIVE PIN region and stood in the FIVE PIN region with the FIVE PIN of FIG. 1, the identification of these two pins is no longer appropriate. Identification of pins is important in the bowling game to define certain configurations of the pins such as splits and the like as part of the scoring of the game. The apparatus of the present invention is preferably used with automatic scoring devices not part of the present invention. Thus, it is necessary to note the presence of each standing pin regardless of its position within a given field on the deck 12 after a ball is rolled and, additionally, it is desirable to identify the pin in accordance with the pin identification region in which the pins are disposed or to prevent identification should such identification be ambiguous as just described. The apparatus built and constructed in accordance with the present invention accomplishes these objectives.

Not shown in FIGS. 1 and 2 is a pass ball detecting mechanism which detects the rolling of each bowling ball rolled by a bowler down the alley across deck 12 or in gutters 14 and 16. Detection of the rolled ball starts the operation of the pin detecting apparatus.

Figure 3:
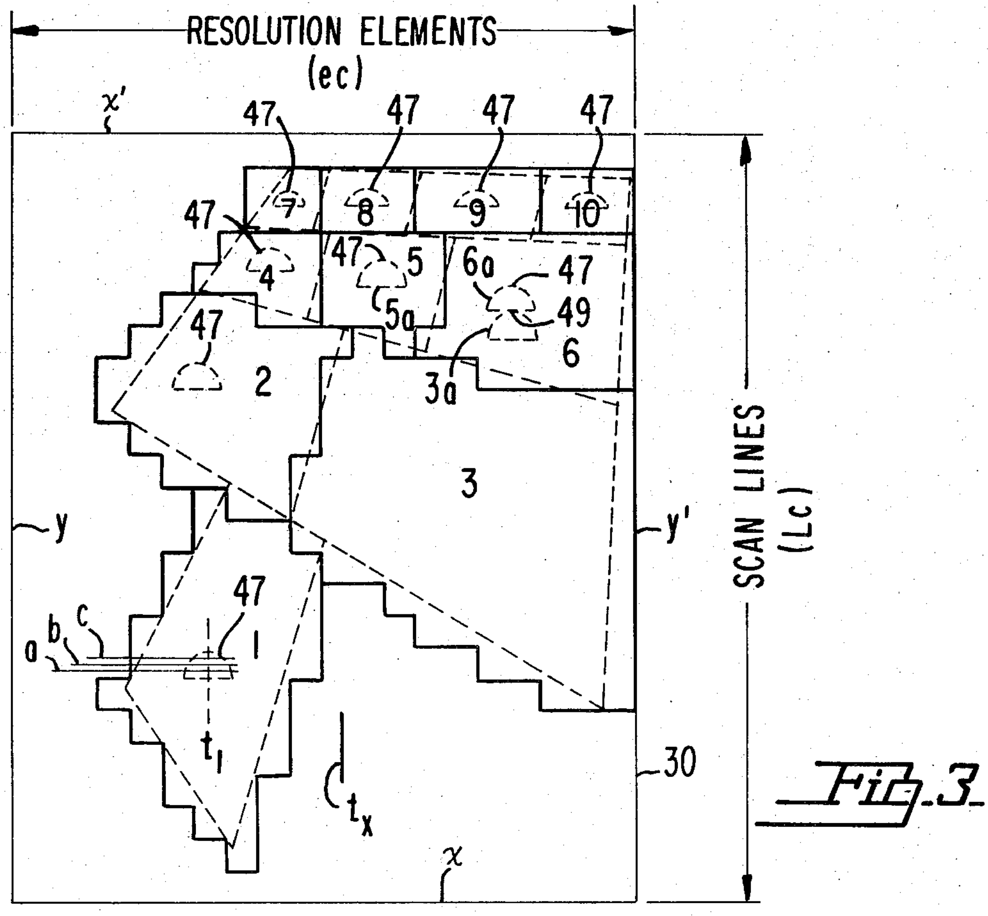

The TV camera 20 is positioned above the pins and faces the alley at an angle approximately in the position as shown in FIGS. 1 and 2 such that the illuminated tips of each of the pins 1 through 10 disposed in beams 26 and 28 will appear as separately identifiable images in the camera field of view 30, FIGS. 3 (shown in phantom), even should the situation arise where one or more of the pins are displaced contiguous to any of the other pins in the line of sight behind each other with respect to the camera 20 anywhere within the camera field of view 30.

The worst case arrangement for detecting standing pins is when two pins are touching and standing behind each other in the camera line of sight. Exemplary of this arrangement are images 3*a* and 6*a* of the tips of the THREE PIN and SIX PIN of FIG. 3 wherein the THREE PIN slid across the deck next to and in front of the SIX PIN. It has been found that even with the steepest camera angle provided within the constraints of a typical bowling alley, the images 3*a* and 6*a* will overlap slightly. However, these images are still separately identifiable as provided herein and the apparatus built and operated in accordance with the present invention will detect the presence of the standing pins manifested by images 3*a* and 6*a*.

If each of the pin identifying regions for pins ONE through TEN of FIG. 1 were laid out in a plane coplanar with the tops of the pins, then they would appear in the camera field of view as the phantom bounded regions 1 through 10 of FIG. 3. The stepped boundaries, solid lines, are an electronic approximation of the actual boundaries of the regions of FIG. 1, are the boundaries actually utilized by the apparatus built in accordance with the present invention, and are produced in a manner to be explained. The actual boundaries are enclosed by the electronic boundaries. The relationship between the phantom imaginary boundaries as seen by the camera and the stepped solid boundaries as approximated by the electronic system to be described is greatly exaggerated for purposes of illustration.

Field of view 30 is defined by a plurality of horizontal sweeps across the field in the direction from the SEVEN PIN to TEN PIN bounded by boundaries $y$ and $y'$ and vertical scans in the direction from the ONE PIN towards the SEVEN through TEN PINS bounded by boundaries $x$ and $x'$. Thus the first scan in a video frame starts at the lower left hand corner of the drawing having coordinates $x$ and $y$ and the last scan of that video frame ends at the upper right hand portion of field 30 having coordinates $x'$ and $y'$. The video camera may be positioned by manual means, by suitable electro-optic arrangements or a combination thereof. A conventional video camera may be utilized such as model WV 400P manufactured by the Matsushita Electric Corporation under the trade name Panasonic.

As will be described later, the images of the pins located within field of view 30, FIG. 3, are detected during synchronized horizontal sweeps and vertical scans of the camera. It is to be noted that camera 20 sweeps field of view 30 from the bottom upwardly in contradistinction to conventional TV cameras which sweep from the top of the field of view downwardly as will become clear later. This modification is within the skill of the art and no further description thereof will be made herein.

The output of camera 20 as is well known, is a video signal comprising a serial stream of pulses with each pulse manifesting a relatively high intensity light area impinging on the camera during a scan such as the light reflected from the illuminated tips of the standing pins A video frame comprises all of the sweeps occurring in a single scan of field 30 within the vertical boundaries $y$ and $y'$ and horizontal boundaries $x$ and $x'$.

As is well known, a conventional video signal from a video camera is one which varies in amplitude proportionally with the degree of light intensity forming the image received by the camera. Such a signal is unsuitable for processing in a system utilizing logic techniques due to ambiguities arising from spurious noise, various shades of gray in the image, and other conditions which prevent a clear demarcation between a pin signal and the extraneous signals appearing in the video unless otherwise provided for. In accordance with the present invention, the video signal is first processed by filtering and shaping the pins signals therein corresponding to the standing pin images, eliminating spurious signals and thus producing a two level logic signal. It is to be understood that hereinafter the term video signal includes the video logic signal after filtering and shaping.

As utilized herein, a two level logic signal commonly referred to as a binary signal, is one in which on level represents a first binary state, a binary one and the other level a second binary state, a binary zero. A binary signal may comprise either a positive potential and a reference potential, positive and negative potentials or reference and negative potentials. In accordance with the description herein, the higher potential is indicated as a "high" or binary one and the lower potential a "low" or binary zero.

A logic system may be referred to as positive or negative. With positive logic an AND gate is enabled when all inputs are high, whereas with negative logic, the output is low with all inputs low. The system described herein will be described in terms of positive logic unless otherwise noted.

A video camera employing a vidicon includes a photosensitive surface which produces a charge when a ray of light impinges thereon. This charge is created at the point of impingement of the light ray. The amount of charge is a function of light intensity. When the photosensitive surface in its entirety is exposed to an image of varying degrees of light intensity, then almost an infinite number of charges are created on that surface. An electron beam is then caused to scan this surface, the beam having a finite width, for example, a milliinch. This beam or spot determines in conjunction with the optics and internal electrical circuitry the resolution of the camera or the ability of the camera to distinguish two closely spaced points of light imaged on the photosurface.

In camera 20 as provided by the present invention there is provided a bandpass filter (not shown) which filters the video signal. This filter limits the high frequency contents of the video signal, improves the signal to noise ratio of the video signal and suppresses shading at the low frequency. This filter has a given bandwidth. The resolution of the camera including the filter is a function of this bandwidth. This resolution is given by the relationship $t_r = 1/\beta_\omega$ seconds where $t_r$ is resolution of the video signal in seconds and $\beta_\omega$ is the bandwidth of the filter. In an apparatus constructed and operated in accordance with the present invention, this filter bandwidth is preferably 1 MHz which provides a camera resolution of 1 microsecond.

In accordance with the present invention the resolution of the camera is such as to distinguish two points of light each smaller than the smallest pin image received thereby as exemplified by the image of pin 7 at the rearmost edge of pin deck 12. That is, camera 20, including the optics, scanning and charging mechanism and circuitry must be able to detect the presence of the smallest expected pin image. However making the resolution of the camera greater than required to detect the presence of, the smallest expected pin image is undesirable, because then the video signal manifesting this image would not be of maximum intensity, would appear as a shade of gray rather than a bright light and would be difficult to detect with logic circuitry.

Also determining the camera resolution is the number of scan lines, the greater the number, the better the resolution. This resolution must also be sufficient to detect the presence of the smallest pin image displaced anywhere in the field of view of the camera. This means at least one scan line must intersect a pin image to provide a pin signal in the video. As described hereinafter, many scan lines may intersect the pin images.

Resolution elements (ec) are to be distinguished from the resolution of the video camera described above. Resolution elements (ec) are quantized time divisions of field of view 30 along each can line. Elements (ec) are provided by passing a logic video signal down a shift register line. Each stage of the shift register then forms one resolution element (ec) in accordance with the shift rate. Preferably, this rate is 3.88 MHz which provides approximately four shift pulses for the smallest pin image in field of view 30 in a preferred embodiment. Thus in this embodiment there are four resolution elements (ec) for the smallest expected pin image.

Field of view 30 is preferably defined by 256 horizontal scan lines and 200 vertical resolution elements (ec) in each scan line. Thus every 200 resolution elements (ec) will indicate the start of a new sweep of an adjacent scan line. Therefore, the count of the resolution elements (ec) with respect to the start of each sweep defines the $x$ time coordinate of any given resolution element in the field of view and, in essence, is the $x$ time position of the occurrence of that element with respect to a time reference provided by the $y$ boundary. The count of the scan lines (LC) manifests the $y$ time coordinate of each of the scan lines and is the time position of each of the scan lines having a time reference provided by the *x* boundary.

In the several drawings a single line connecting the various portions of the circuit may in practice represent a cable. The various lines in the cables are not illustrated in the interest of clarity of presentation.

Figure 4:
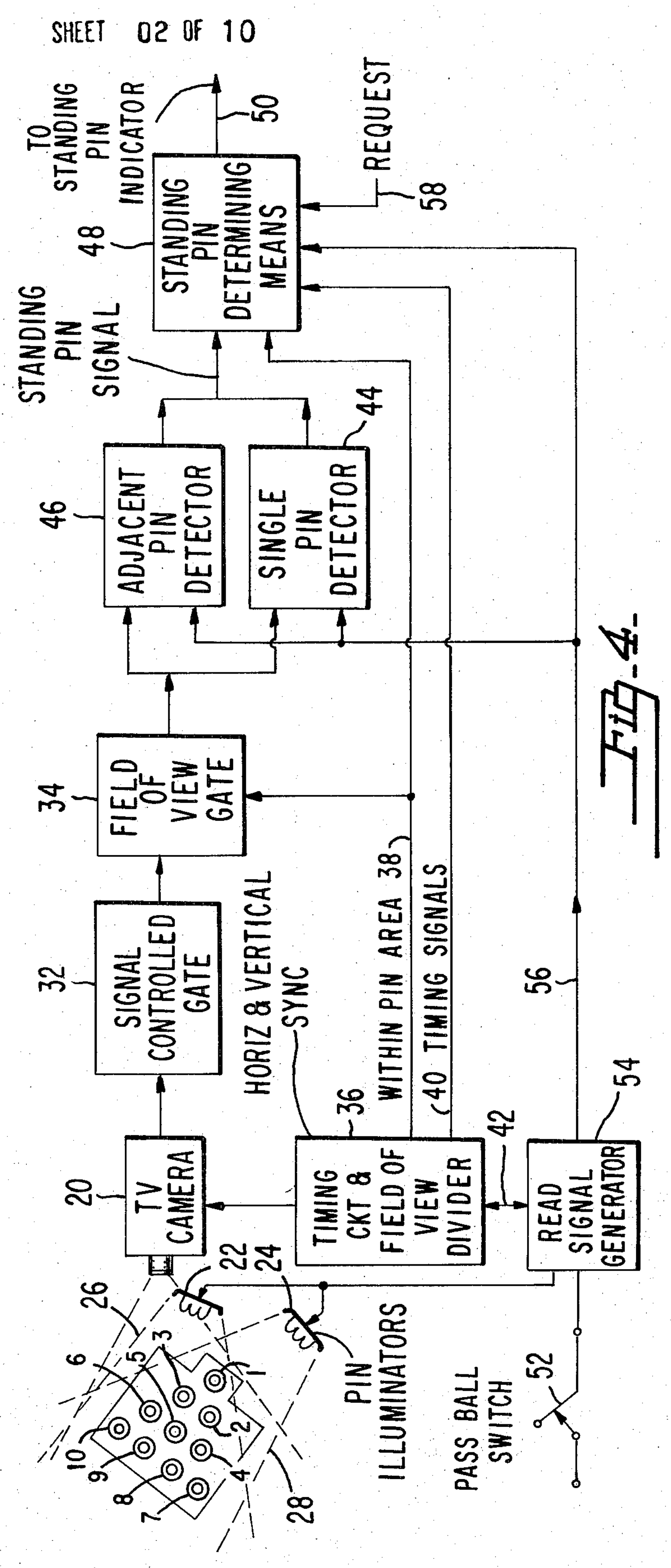

In FIG. 4, the filtered video output of TV camera 20 is applied to a signal controlled gate 32. Gate 32 is controlled by the amplitude and time duration characteristics of the video signal applied as an input thereto and serves to eliminate spurious signals in the video and to pass only those video signals which exceed a given threshold level and minimum pulse width, processing the video so as to form a two level logic signal.

The output of signal controlled gate 32 includes pulses at the logical one or "high" state which manifest standing pins, and is applied to field of view gate 34 which serves to pass to the output thereof only those logical one pulses which occur within the bounded pin identifying regions of field of view 30 of FIG. 3. Logical one signals generated during video retrace, and outside the pin identifying boundaries 1 through 10 are blocked by gate 34.

Timing circuit and field of view divider 36 including logic circuits and a reference clock divides field of view 30 into various pin identifying regions 1 through 10 in synchronism with the sweeps and scans of camera 20 to generate a region identifying signal, e.g., a logical one, whenever any of the sweeps intercepts one of the pin identifying regions 1 through 10. The time of occurrence of the region identifying signal is timed so as to occur in time coincidence with the interception of a pin region by the corresponding video sweeps. These pin identifying signals are applied to coupling 38. Timing circuit and field of view divider 36 also generates the vertical and horizontal sync signals for camera 20 which are derived from the same timing reference as the region identifying signals. Additional timing signals are applied to couplings 40 and 42 as will be explained.

The video output of gate 34 comprising binary one and zero signals is applied as an input to single pin detector 44 and adjacent pin detector 46. As explained above, the images of each of the pins in field of view 30 may be isolated from one another or the images of two pins may overlap. Single pin detector 44 detects the presence of one standing pin whether in the form of isolated images or overlapping images by sampling each of the video logic signals manifesting the images detected by the camera for the presence of the same given portion 47 of each pin image (FIG. 3). In case of overlapping images, detector 44 produces one standing pin signal for the two images. In the preferred embodiment, portion 47 (FIG. 3) is the upper rounded edge of the pin image. It has been found, however, that when pins are standing contiguous to each other so the images overlap, as indicated by images 3*a* and 6*a* of FIG. 3, then that given portion 47 of the image, e.g., image 3*a*, of one of the pins may be obscured by the image, e.g., image 6 *a*, of the other adjacent standing pin. When this condition is present, the single pin detector 44 will not detect the presence of the second adjacent standing pin.

To overcome this condition, adjacent pin detector 46 is provided. Detector 46 detects the presence of the second standing pin whose image, e.g., image 3*a*, overlaps the pin image, e.g. image 6*a*, of the other standing pin. The adjacent pin detector 46 examines the overlapping images for a particular characteristic manifested only when the overlapping images are present. In the preferred embodiment, this characteristic is the interface 49 of the two overlapping images manifested by the narrow neck of the two images. When this characteristic is present, then pin detector 46 will generate a standing pin signal for the pin having the obscured image portion 47. Means are provided so that adjacent pin detector 46 will detect the presence of one of these two standing pins and single pin detector 44 will detect the presence of the other of these two pins.

The outputs of detectors 44 and 46 are applied to standing pin determining means 48. Also applied to means 48 are the pin identifying signals from divider 36 via coupling 38. Means 48 is programmed in a manner to be explained and includes logic circuitry for correlating a received standing pin signal with a particular pin identifying signal in accordance with the time of occurrence of the standing pin signal and the region identifying signal so as to indicate both the presence of a standing pin and its identity. Should two standing pin signals manifesting two separate distinct pins occur in time coincidence with a pin region identifying signal manifesting the same pin region, then means 48 is programmed to prevent identification of any of the standing pins manifested by the standing pin signals received thereby and serves only to total the number of pins manifested by each of the standing pin signals applied thereto.

Pass ball switch 52 is closed after the ball passes a given location on the alley after a bowler rolls a ball on the alley in a bowling game. When this occurs signal generator 54 generates a pin illuminate signal which activates pin illuminators 22 and 24. Additionally, generator 54 generates a read signal which permits detectors 44 and 46 to process the received video signal from gate 34 to generate a standing pin signal for any pin standing in field of view 30. At this time the standing pin signals are applied to determining means 48 which compares the pin standing signals, $P_s$, timing with the pin identifying signals timing to identify or count, as the case may be, the standing pins upon receipt of a read signal from generator 54.

Means 48 receives and processes this pin detection information and stores it until the information is requested therefrom. For example, a pin information request signal N may be applied to means 48 along lead 58 by a central computer or processor. The signal on lead 58 causes means 48 to generate at its output 50 standing pin information stored therein.

Preferably, means 48 derives at output 50 thereof a signal manifesting either the total pin count or a signal manifesting each standing pin and its identification. Of course both pin identification and total pin count could also be provided at the same time at output 50 as determined by a particular application. Timing signals applied along coupling 40 to means 48 serves to clear means 48 of information previously stored therein and to perform other timing functions for the various logic circuitry in means 48.

Figure 5:
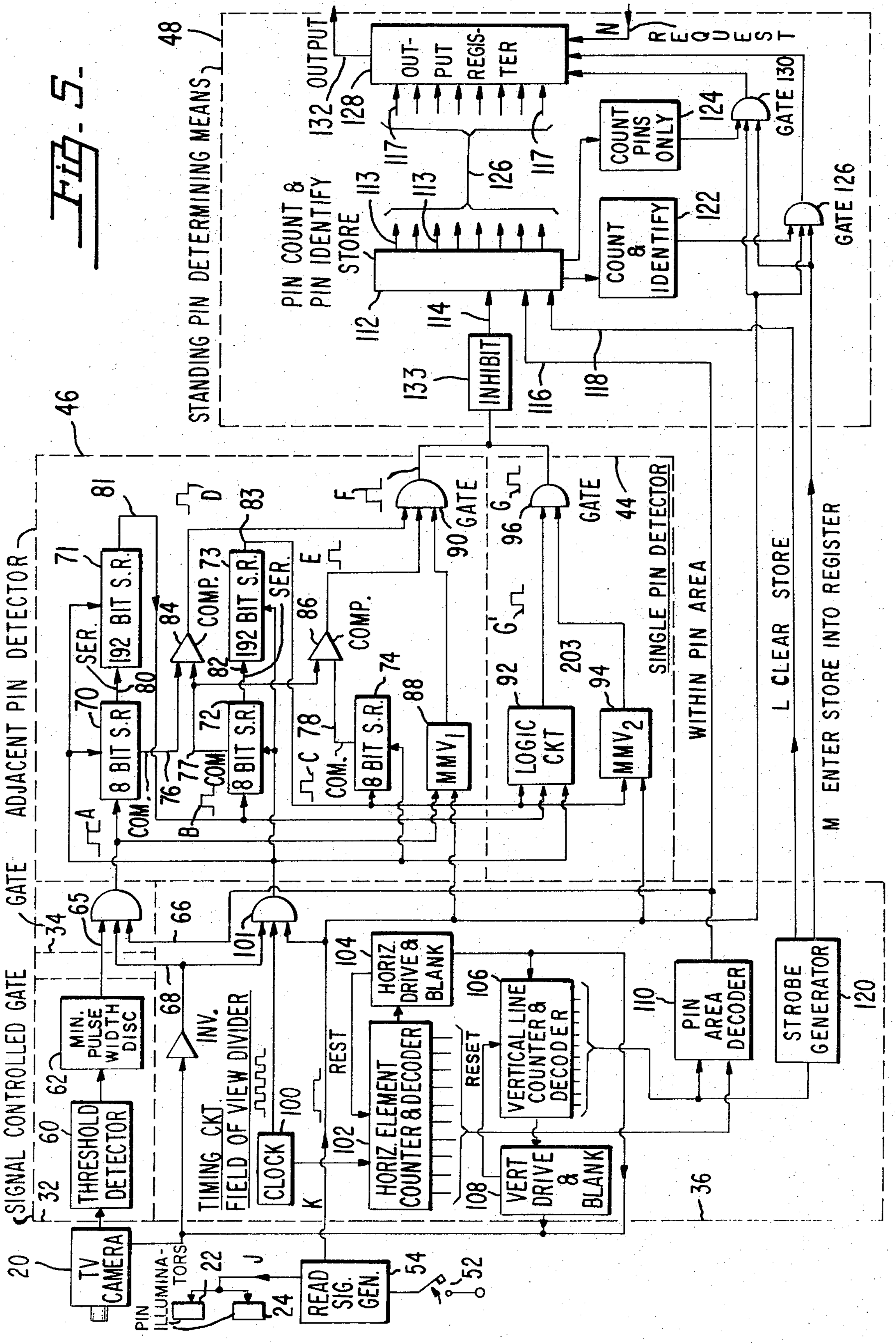

In FIG. 5 there is shown a preferred embodiment of the system of FIG. 4 wherein signal controlled gate 32 includes threshold detector 60 and minimum pulse width discriminator 62. Threshold detector 60 is a suitable circuit which detects the presence of those video signals which exceed a minimum threshold level. The detection level for threshold detector 60 is set to detect only those video signals which manifest a received pin image.

Those video signals that exceed the minimum threshold level are applied by detector 60 to minimum pulse width discriminator 62 which will be described in greater detail in conjunction with FIG. 13. Discriminator 62 rejects those pulses in the video signal whose time duration or pulse width is less than a minimum value and passes to gate 34 via lead 64 those pulses in the video signals which meet or exceed that minimum value. An inhibit signal is applied to gate 34 via input 66 whenever the scanning beam is not in regions 1 to 10. A second inhibit signal is applied to gate 34 on input 68 whenever the scanning beam is in horizontal or vertical retrace.

Adjacent pin detector 46 comprises serially connected shift registers 70 through 74. Shift registers 70, 72 and 74 each have respective common outputs 76, 77 and 78, and additionally, shift registers 70, 71, 72 and 73 each have respective serial outputs 80, 81, 82 and 83 such that a video signal applied as an input to shift register 70 will be shifted through each of the shift registers in sequence. Each stage of the respective shift registers corresponds to one horizontal resolution element (ec) of field of view 30 of FIG. 3.

Shift registers 70, 72 and 74 are identical and shift registers 71 and 73 are identical, respectively. Shift registers 70 and 71 together serve to divide each sweep bounded by the $y$ and $y'$ time boundaries of field of view 30 into a number of resolution elements corresponding to the number of stages in those two shift registers. It will now be apparent that the contents of registers 70 and 71 correspond to the video generated during the time period of a single sweep.

Shift registers 72 ane 73 have a like number of stages as registers 70 and 71, respectively, and therefore contain the video signal also generated during the time period of a single sweep of the camera. Register 70 is preferably provided with eight stages while shift register 71 is provided with 192 stages which together comprise the 200 resolution elements described previously. It will thus be appreciated that each corresponding stage of shift registers 70, 71, 72, 73 and 74 contain a video signal occurring in the same x time coordinate on adjacent scan lines e.g., $t_x$ of FIG. 3 in accordance with the ordinal position of that stage with respect to the output of gate 34. Thus, the contents of stages of shift registers 70, 72 and 74 having the same corresponding ordinal position, for example, the first stage, is a video signal occurring in next adjacent sweeps in the same $x$ time position, e.g., $t_x$.

Since each stage of shift registers 70, 72 and 74 are coupled together to form the common outputs 76, 77 and 78, the signals on these common outputs is a voltage whose amplitude is related to the time duration or pulse width of the video signal then in the respective shift registers 70, 72 and 74. Common outputs 76 and 77 are applied as respective inputs to comparator 84 while outputs 77 and 78 are applied as respective inputs to comparator 86.

Comparator 84 is a suitable device provided to generate a logical output signal D having a given level, for example a high, whenever the voltage of common output 76 is greater than the voltage at common output 77. If the video input to shift register 70 manifesting a standing pin is designated A and the standing pin video input to shift register 72 as B, then comparator 84 is arranged so that the value of D will be the given value, logical one, only when the value of A is greater than the value of B in time duration or pulse width. See the table of FIG. 7. The letters A, B and C with or without the primes correspond to the position of those signals in FIG. 5 with those letters. Since the pulses shifted by shift registers 70 and 72 are the video signals generated by images of standing pins, then the number of stages selected in shift registers 70 and 72 for comparison to each other is that number that will accommodate the largest expected pulse width of the pin standing video signal. In the preferred embodiment, it has been found that an eight stage shift register distinguishes between the expected differences in pulse width in the video signal manifesting the pin image impinging upon TV camera 20. Of course, the number of stages used for comparison to each other are related to camera position, optics and related factors which affect image size.

Common terminals 77 and 78 are applied as inputs to comparator 86 which is similar to comparator 84 and is arranged so that an output signal E of a given value, for example a high, will be generated when the amplitude of the signal at common terminal 78 is greater than the amplitude of the signal at common terminal 77. This occurs when the video signal C pulse manifesting a standing pin stored in shift register 74 is greater in time duration than video signal B pulse manifesting a standing pin signal in shift register 72. See the table of FIG. 7 and the waveforms of FIG. 9.

Detector 46 includes monostable multivibrator (MMV) 88 which is triggered by the time coincidence of a falling edge of a video signal A pulse and the READ SIGNAL supplied by read signal generator 54 to generate a standing pin signal $P_s$, e.g., a logical one, in waveform F which is passed by gate 90 when signals D and E are the same logical value e.g., highs or logical ones. Preferably $P_s$ of waveform signal F is provided as a short duration 100 nanosecond spike. This spike is generated by $MMV_1$ 88.

Single pin detector 44 comprises logic circuit 92, monostable multivibrator ($MMV_2$) 94 and AND gate 96. The output of circuit 92 and $MMV_2$ 94 enable gate 96 whenever a single standing pin is detected, i.e., a pin standing alone or a pin standing adjacent one or more other pins. Detector 44 generates a pin standing pulse $P_s$ in waveform G (see FIG. 11) when, and only when, video signal B at output 81 and video signal C at output 83 have logical states which manifest the same given portion of each pin image, e.g., portion 47 of FIGS. 8 and 9. Preferably, when examining the video signals for portion 47, video signal B is at a logical zero state and video signal C is at a logical one state (see condition 4 of FIG. 7). Detector 44 and circuit 92 will be described in greater detail later.

Timing circuit and field of view divider 36 includes a reference clock 100. Clock 100 provides timing signals or shift pulses having a phase $\phi_1$ through gate 101 to each of shift registers 70 through 74 to shift out the information in each stage to the next adjacent stage. Gate 101 passes the clock shift pulses (is enabled) when a read signal, logical one, from read signal generator 54 is applied thereto and the camera is not in retrace.

Horizontal element counter and decoder 102, horizontal drive and blank circuit 104, vertical line counter and decoder 106 and vertical drive and blank circuit 108 are serially connected to clock 100 as shown. Horizontal element counter and decoder 102 includes a plurality of binary coded decimal (BCD) counters and corresponding respective units, tens and hundreds decoders which provide an output signal manifesting the count of each of the clock pulses applied thereto in a video frame. The decoders include a plurality of AND gates which are coupled to select outputs of the units, tens and hundreds decoders so as to provide an output signal, e.g., logical one, at each of a plurality of the respective AND gates outputs manifesting a different horizontal count of the horizontal elements in increments of tens.

This is accomplished by coupling one input of a first plurality of AND gates to the zero output of the tens decoder of the horizontal element counter and the other input of each of these AND gates to respective different ones of the outputs of tens decoder such that these AND gates have an output signal manifesting separate, different horizontal counts (ec) 10 through 90, of the elements. A second plurality of AND gates each have one input thereof coupled to the 100's output of the hundreds decoder of the horizontal element counter and the other second inputs thereof coupled to one of the zero through 90 outputs of the tens decoder of the horizontal counter so that the outputs of these second plurality of AND gates manifest counts in a selected range preferably between 100 and 200 in units of tens. These AND gates, therefore, each have a different output signal manifesting a different element count (ec) in tens increments.

The horizontal drive and blank circuit 104 is responsive to certain of the units, tens and hundreds outputs of the horizontal decoder 102 so as to provide a blanking signal between 200 and 246 horizontal element counts (ec). This blanking signal is used to sync the camera 20 and to inhibit gate 34 and gate 101 as well as to provide a reset signal for counter and decoder 102 at the end of 246 horizontal element counts. At the end of 246 horizontal element counts, a signal is provided to the input of vertical line counter and decoder 106. In effect the output of horizontal drive and blank circuit 104 is a signal manifesting the completion of a single sweep.

Vertical line counter and decoder 106 includes a second plurality of binary coded decimal (BCD) counters which count the number of scans then being completed by the TV camera 20 in a video frame. The BCD counter is coupled to respective ones of the units, tens and hundreds outputs of the decoder thereof which has a plurality of outputs each having a signal manifesting a count in units, tens and hundreds. The decoder portion of circuit 106 includes a plurality of AND gates. In these vertical line counter decoder AND gates, a first plurality of gates has a common input to the zero output of the tens decoder. The other respective inputs are coupled to selected ones of the hundreds and tens decoder outputs so as to generate a count manifesting line counts (LC) in a selected range preferably 30 to 250. Vertical drive and blank circuit 108 is responsive to certain of these plurality of outputs of circuit 106 so as to generate a blanking and vertical sync signal between 256 and 276 lines.

Figure 12A:
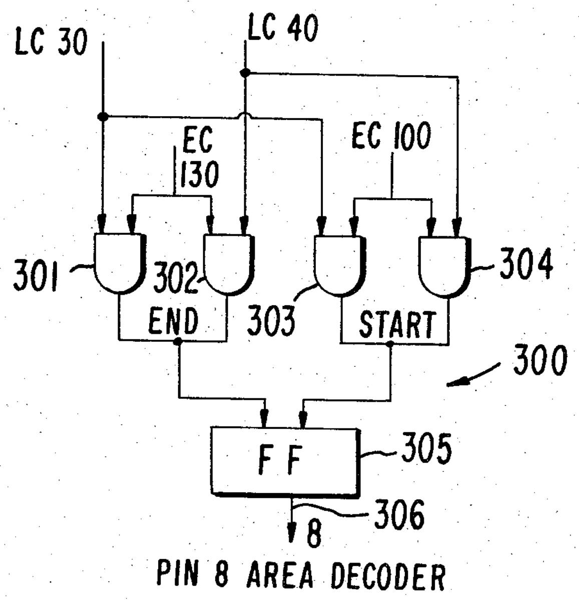

The horizontal element counts (ec) and the vertical line counts (LC) are applied to pin area decoder 110. Pin area decoder 110 includes a plurality of networks of AND gates and flip-flops which combine the horizontal element counts (ec) and the vertical line counts (LC) to generate a signal whose time position defines each of the bounded regions 1 to 10 of FIG. 3. Details of pin area decoder 110 will be given in selected examples for an EIGHT PIN area decoder and a SIX PIN area decoder in conjunction with FIGS. 12*a* and 12*b*, respectively. The output of pin area decoder 110 is a signal of a given logical level, e.g., high, whose time position manifests the identity of each of the pin regions 1 through 10 accordingly. The time of occurrence of the signals at the output of decoder 110 with respect to the time of occurrence of the pin standing signals $P_s$ of waveforms F and G determines the identity of a particular pin signal. Each pin standing signal $P_s$ indicates one standing pin. The time of these decoded pin region identifying signals is synchronized with the sweeps and scans of camera 20 by way of the horizontal and vertical blank signal generators 104 and 108, respectively, since the timing of the sweeps and scans of camera 20 and the time position of the output of area decoder 110 are derived from clock 100. The output of area decoder 110 is applied to gate 34 so as to enable gate 34 only when the output of 110 manifests a pin region. Additionally, decoder 110 output is applied to standing pin determining means 48 for identifying each signal $P_s$ as applicable.

Standing pin determining means 48 is a preprogrammed arrangement which includes pin count and pin identify store 112 which receives a pin standing signal on input lead 114 through inhibit means 132 from detectors 44 and 46. A pin identification signal is applied to input lead 116 and a clear signal L is applied to lead 118 generated by strobe generator 120. Clear signal L on lead 118 is generated by generator 120 at the end of each video frame and clears the count in store 112 enabling the store to be ready for the next occurring pin signals applied on lead 114. Pin count and pin identify store 112 is a suitable circuit which totals all the pin signals applied thereto as well as identifies each of the pin signals $P_s$ in accordance with the time coincidence of a pin region identifying signal on lead 116 with the pin signals $P_s$ on lead 114.

Store 112 is provided with a first output which is applied to count and identify circuit 122 and a second output which is applied to count pins only circuit 124. A plurality of parallel outputs 113 corresponding to a different respective pin identification is applied from store 112 along coupling 126 to like parallel corresponding pin identifying and pin counting inputs 117 of output register 128. Whenever each standing pin signal on lead 114 occurs in time coincidence with a separate, different pin identifying region 1 through 10, then store 112 generates a count and identify signal to be applied to count and identify circuit 122 and an inhibit signal to be applied to count pins only circuit 124. In this condition count and identify circuit 122 generates an output signal, for example, a high or logical one which is gated by gate 126 into output register 128 which sets register 128 so as to receive from store 112 pin count and identification information signals.

Gate 126 is enabled whenever a strobe signal M is generated by strobe generator 120 for causing register 128 to be loaded with the contents of store 112 as pin count and pin identification signals. The information in store 112 remains therein and is not applied to register 128 until gate 126 is enabled. Strobe generator 120 is a suitable circuit which derives clear signal L and an enter register strobe signal M from decoder 106.

Clear store signal L is applied to store 112 at the beginning of a video frame to clear the store in readiness for the reception of new information, whereas the enter register strobe signal M applied to gate 126 is generated at the end of that video frame, signals L and M being generated during a read signal K which is one video frame in time duration.

Should two or more pins occur in time coincidence with the same pin identifying region 1 through 10, store 112 senses this condition and causes count and identify circuit 122 to generate a first signal which disables gate 126 and count pins only circuit to generate a second signal which enables gate 130 when a read signal K and strobe signal M occur in time coincidence. When gate 130 is enabled by the time coincidence of the second signal, read signal K, and strobe signal M, gate 130 passes strobe signal M to output register 128 such that output register 128 is loaded with total pin count information only with no pin identification. Both gates 126 and 130 are enabled upon receipt of a read signal from read signal generator 54, strobe signal M from generator 120 and an enabling signal from corresponding circuits 122 and 124, respectively.

Standing pin determining means 48 also includes inhibit circuit 133. Inhibit circuit 133 converts two single pin signals generated for the same single pin into a single pin signal in a situation wherein a defect in reflectivity characteristics of a pin head is such that the reflected light off the top of the pin forms two separate, distinct pin images for that one pin. Should this occur it is known that the entire pin image for the given embodiment has a given time duration, for example four to eight microseconds, in the present embodiment. Thus, since this image is split into two separate images, then the two separate images must occur within this given time duration, in this case, eight microseconds. Inhibit circuit 133 inhibits the passing of the second of two pin signals for a time duration of about half the time duration of the longest expected video standing pin pulse. For example, four microseconds after a standing pin pulse is received by circuit 133, circuit 133 inhibits the passing of another standing pin pulse for another four microseconds. Thus, should two separate pin standing signals occur within the given period, circuit 133 after a first pin signal is received does not respond until half the given period has passed or until after the second standing pin signal is received.

The operation of the apparatus of FIG. 5 will now be explained with reference to FIG. 6. After a bowler rolls the ball on the alley, switch 52 is momentarily closed generating a pass ball detection pulse (PBD), waveform I, which is applied to read signal generator 54. Generator 54 generates a pin illuminating signal waveform J, FIG. 6, having an appropriate time duration, preferably of about three seconds to permit the standing pins to settle down prior to their detection. Upon receipt of the pulse of waveform J, illuminators 22 and 24 illuminate field of view region 30 including the standing pins, if any. At the end of the illumination period of waveform J, generator 54 generates a read pulse, waveform K, having a time duration of one video frame. In practice the read K signal will occur while the pins are still illuminated even though the illuminated signal J has terminated due to the delay in the response of the pin illuminators. That is, the pins are still illuminated during the period of the pulse of read signal K. It will be appreciated that the time scale for the vertical sync signal of waveform H and the read signal of waveform K is greatly exaggerated with respect to the time duration of the video signal, the PBD signal, waveform I and the pin illuminating signal, waveform J.

Figures 6, 7:
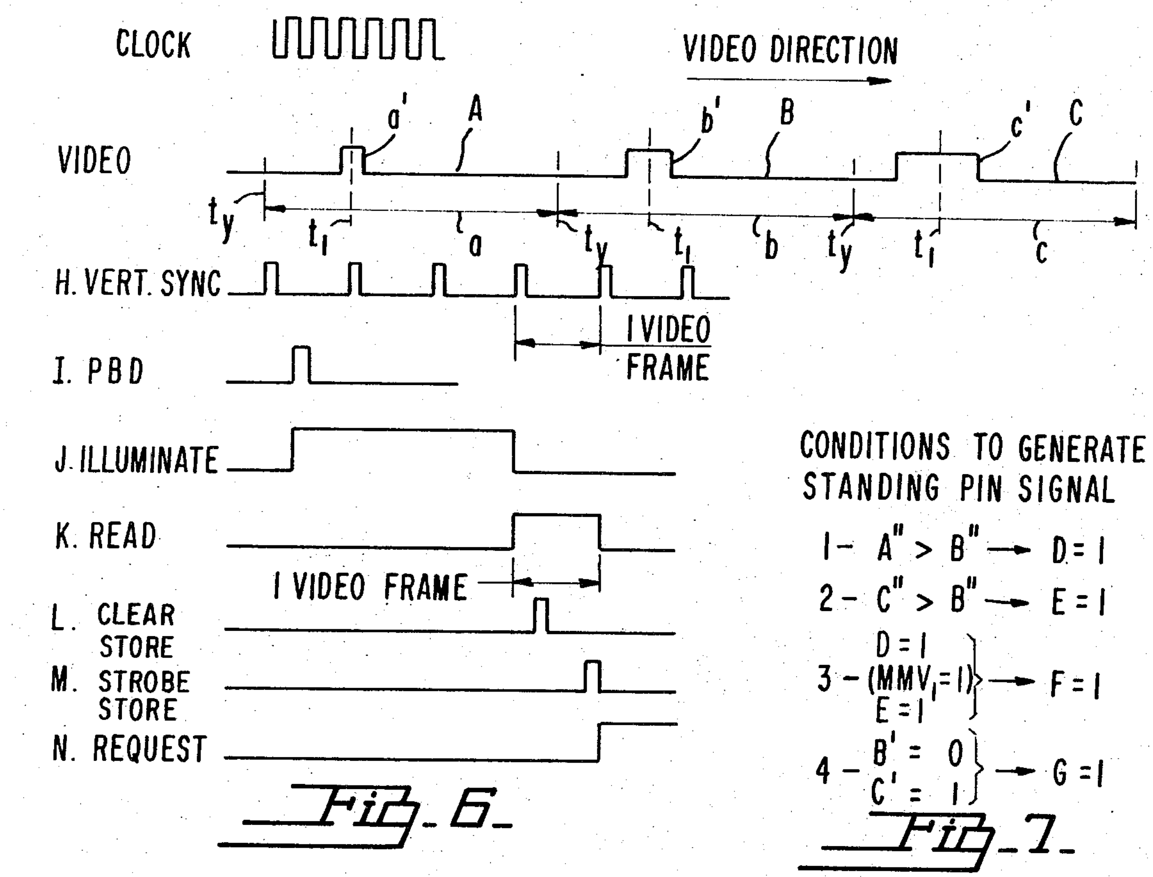

In the meantime, the video signal which includes pin standing information pulses such as pulses $a'$, $b'$ and $c'$ of FIG. 6 which exceed a minimum threshold level as determined by detector 60 (FIG. 5) and a minimum width or time duration as determined by discriminator 62 and which occur in any of the sweeps in field of view 30 (FIG. 3) which intercept pin identifying regions 1 through 10 is applied to adjacent pin detector 46 and shift register 70 of detector 44 through gate 34. When the video signal is sequentiallly shifted, in a conventional manner, into the registers 70 through 74 by the clock signal passed by enabled gate 101, each of the video signals A, B and C, manifesting successive scans a, b and c, respectively, FIGS. 3 and 6, are applied as respective inputs to shift registers 70, 72 and 74 in the same time position $t_1$ in three next adjacent corresponding respective scans, *a*, *b and c*. It will be recalled that the ordinal position of each of the stages of registers 70, 71, 72, 73 and 74 with respect to their respective inputs manifests the same time position $t_x$ of FIG. 3 in all of the scans.

When camera 20 has made one sweep bounded by boundaries *y* and *y'* along the *x* coordinate in the beginning of a video frame, the video signal manifesting the information recorded by the camera will be present only in shift registers 70 and 71. When the camera completes the next sweep vertically toward the *x'* boundary, the first occurring sweep information will now be shifted into two registers 72 and 73 and the second occurring sweep will now be present in shift registers 70 and 71 and so on for each of the successively occuring sweeps. At any given time, the information present on any of the scan lines such as scan lines a, b and c at any time $t_x$ such as $t_1$ will be present in the same ordinal position stage of registers 70, 72 and 74, respectively.

Comparator 84 (FIG. 5) compares the voltage level at common terminals 76 and 77 of registers 70 and 72, respectively, and therefore compares the time duration of a standing pin signal pulse $a'$ in shift register 70 with the time duration of a standing pin signal pulse $b'$ in shift register 72 which occur in the same time position $t_1$ in next adjacent scans *a* and *b*, respectively. Likewise, comparator 86 compares the voltage level at common terminals 77 and 78 of registers 72 and 74, respectively, and therefore compares the time duration of pin standing signals $b'$ and $c'$ occurring in the next adjacent scans *b* and *c*. Thus the importance of preserving the width A of the video pulse manifesting a standing pin while rejecting all other pulses by discriminator 62 is apparent.

Figure 8:
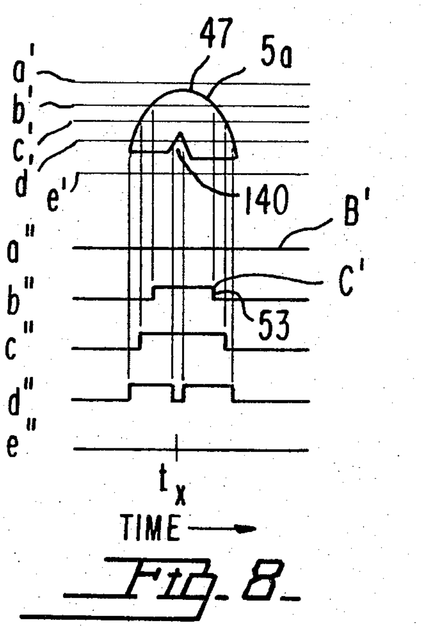
Figure 9:
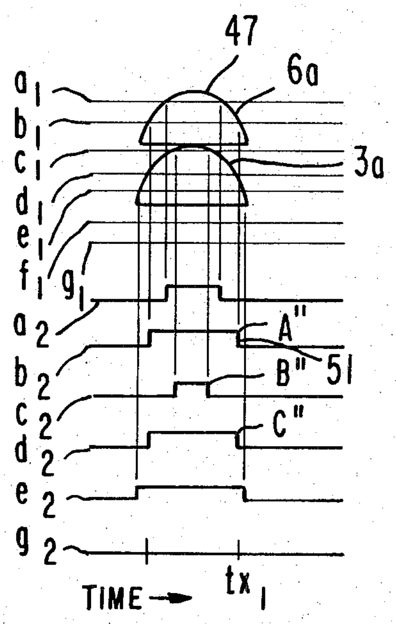

The operation of detectors 44 and 46 will be more readily understood in conjunction with the following explanation of the shape of the pin images as shown in FIGS. 7, 8 and 9 wherein FIG. 7 is a table of conditions indicating certain combinations of the video pulses of FIGS. 8 and 9 which will result in standing pin signals being generated. FIG. 8 is an enlarged view of pin image 5a which is bifurcated at a lower edge 140 and has a substantially continuous rounded edge at upper portion 47 adjacent a nonimage area of field of view 30. The shapes of the images for each of the standing pins throughout the field of view are substantially the same while their size varies. In FIG. 8 several scan lines $a'$ through $e'$ are shown wherein line $e'$ occurs first in time and line $a'$ last. Video signals corresponding to these scan lines are respectively shown by waveforms $e''$ through $a''$. As shown, the pulse width of each of the pulses of the video signals $a''$ to $e''$ is determined by the width of the portion of the image which is then being intercepted, the scan line intercepting portion 47 being the narrowest. It is readily apparent that image 5$a$, typical of all the pin images, will generate in a scan line $b'$, a pulse C' having a logical one state and in scan line $a'$ a signal $a''$ having a logical zero state. This occurs once for every pin image. Detector 44 compares the video signals for the presence of these two logical states at any given time $t_x$ in adjacent scan lines in the order shown.

In FIG. 9, overlapping images 3$a$ and 6$a$ of FIG. 3 are illustrated in enlarged, exaggerated form. Image 6$a$ has an upper portion 47 similar to portion 47 of image 5$a$. Image 3$a$, overlapping image 6$a$, does not have a portion 47 manifested by a logical one adjacent to a non-image area manifested by a logical zero, as present in image 5$a$ of FIG. 8. In this case, it is clear that the single pin detector 44 will not detect the presence of standing pin 3 manifested by image 3$a$. Each of the scan lines of FIG. 9 are designated $a_1$ through $g_1$ and the corresponding video signals are shown by waveforms $a_2$ through $g_2$, respectively. It has been found that in every case of overlapping images, which is the worst case arrangement for any of the standing pins, a video signal $c_2$ is present and has a pulse B'' of narrower pulse width than the pulses A'' and C'' of video signals $b_2$ and $d_2$ in the lower and upper next adjacent scans $b_1$ and $d_1$, respectively. Thus by detecting for this combination of pulse widths in suitable circuitry the presence of any standing pin adjacent a second pin such as pin 3, manifested by image 3$a$, can be detected. This is accomplished by comparing the pulse width of pulses A'' and B'' in video signals $b_2$ and $c_2$, respectively, and then comparing the width of the pulses B'' and C'' in video signals $c_2$ and $d_2$, respectively. When the compared pulse widths meet the conditions 1 and 2 of the table of FIG. 7, then a standing pin signal $P_s$ in waveform F is generated upon the occurrence of a read signal.

It will be recalled that multivibrator ($MMV_1$) 88 is triggered by the falling edge of a pulse in video signal A of FIG. 5. In FIG. 9, this will occur with the occurrence of falling edge 51 of the pulse A'' of video signal $b_2$ which occurs in time $t_{x_1}$. At this time the contents of shift registers 70, 72 and 74 will respectively include each of the pulses of video signals $b_2$, $c_2$ and $d_2$, respectively.

In FIG. 10$a$, there is illustrated in detail one form of the logic circuit 92 of FIG. 5. In describing the circuit of FIG. 10$a$, reference will be made to the accompanying timing diagram of FIG. 11. In FIG. 11, different possible combinations of the presence and absence and pulse widths of the pin indicating signals generated in any scan line are shown in the various time periods $T_1$ through $T_5$. Circuit 92 includes latch 200 which includes two cross coupled NAND gates, as shown. Latch 200 has first and second inputs 201 and 202. Video signals C and B are applied as respective different inputs to NAND gate 204 having an inverted output 201, the NAND gate being a device whose inverted output will be low only when the two inputs are high, otherwise the output is high. Video signals C and B are also coupled to the respective inputs of gate 206 whose output is inverted via inverter 208 and applied as a first input to NAND gate 210. The output signal of the inverter 208 will be high only when both input signals B and C are low.

A clock signal from clock 100, FIG. 5, whose phase $\phi_2$ is shifted 180° in phase shifter 212 from the phase of the shift pulses $\phi_1$ applied to shift registers 70–74, is a second input to gate 210. Operation of the circuit of FIG. 10 is self-explanatory from examination of the timing diagram of FIG. 11 in conjunction with the truth table of FIGS. 10$b$ and 10$c$. Note that latch input 202 is high (binary one) whenever B or C is high for the time duration of the longer of B or C plus the time period of one-half cycle of the clock due to the 180° phase shift of the clock. The pulse generated by multivibrator 94 of FIG. 5 is triggered by the falling edge of the pulse of video signal C. By insuring latch 200 output 203 remains low whenever C and B are both present and for one-half clock cycle thereafter, the pulse output of multivibrator 94 occurring in time coincidence with this low will be blocked at gate 96. Otherwise, if no pulse is present on video signal C,$MMV_2$ 94 will not be triggered and no standing pin pulse $P_s$ produced. Only when video signal B remains a logical zero during the time period when video signal C is a logical one will latch output 203 waveform $G^1$ be a logical one in time coincidence with the falling edge of the pulse of video signal C, enabling gate 96 during the pulse output time of $MMV_2$ 94, generating the pin standing signal $P_s$. In FIG. 8 the falling edge of the pulse of video signal C is shown by edge 53 of pulse $C^1$. Note that only in scan period $T_4$ is a standing pin signal $P_s$, waveform G, generated (condition 4, FIG. 7).

In FIG. 12$a$ there is shown an exemplary circuit 300 of a pin area decoder which is part of pin area decoder 110 of FIG. 5. Circuit 300 generates at output 306 a signal manifesting PIN EIGHT region whenever the sweeps of the camera intercept the EIGHT PIN region of FIG. 3. Circuit 300 includes a plurality of AND gates 301 to 304. An output from either of AND gates 303 or 304 applied to an input of flip-flop 305 generates a high, logical one, at the flip-flop output 306 initiating a pin identifying signal. The high at output 306 indicates that the video sweep is occurring within the area indicated in solid lines surrounding the numeral 8 of FIG. 3. On the other hand, an output from either of AND gates 301 or 302 trips flip-flop 305 to provide a low on output 306 indicating that the sweep is without the pin area 8 solid lines of FIG. 3. The inputs to AND gates 301 to 304 are selected ones of the line counts (LC) and element counts (ec) of line decoder 106 and horizontal element decoder 102 of FIG. 5.

As an example of the operation of circuit 300, assume whenever element counter and decoder 102 reaches a count of 30 or 40, then the outputs of AND gate 303 and 304 are high. Therefore, whenever the sweep is 100 element counts (ec) from the y boundary and the scans are between 30 and 40 lines (LC) from the $x'$ boundary, then flip-flop 305 indicates that the sweep is then intercepting pin identifying region 8.

On the other hand assume one of the separate, different inputs to each of AND gates 301 and 302 are line counts (LC) 30 and 40, respectively, as shown, and the other is element counts (ec) 130. Whenever the element counts (ec) reach 130 from the y boundary and the line counts (LC) 30 and 40, then AND gates 301 and 302 indicate by the output signal thereof that the end of pin section 8 is reached. This end signal is then applied to flip-flop 305 to switch the level of the output signal on lead 306. Thus, the output on lead 306 will be high whenever the sweep is between line counts 30 and 40 and element counts 100 and 130, at all other times the output on 306 will be low. This high signal is applied on lead 116 of FIG. 5 to pin count and pin identify store 112.

Figures 10A, 10B, 10C:
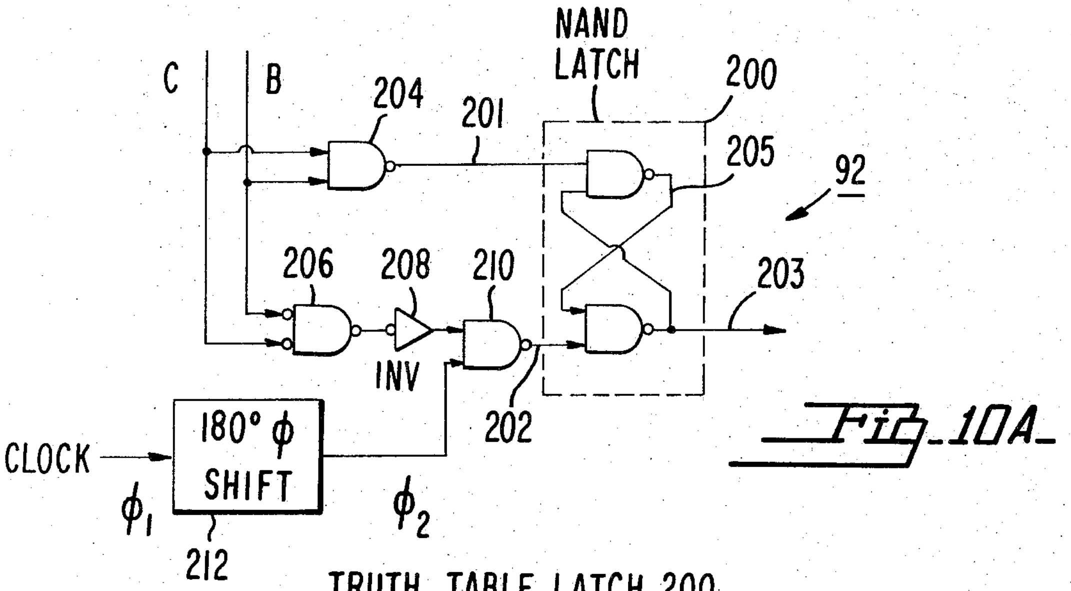
Figure 11:
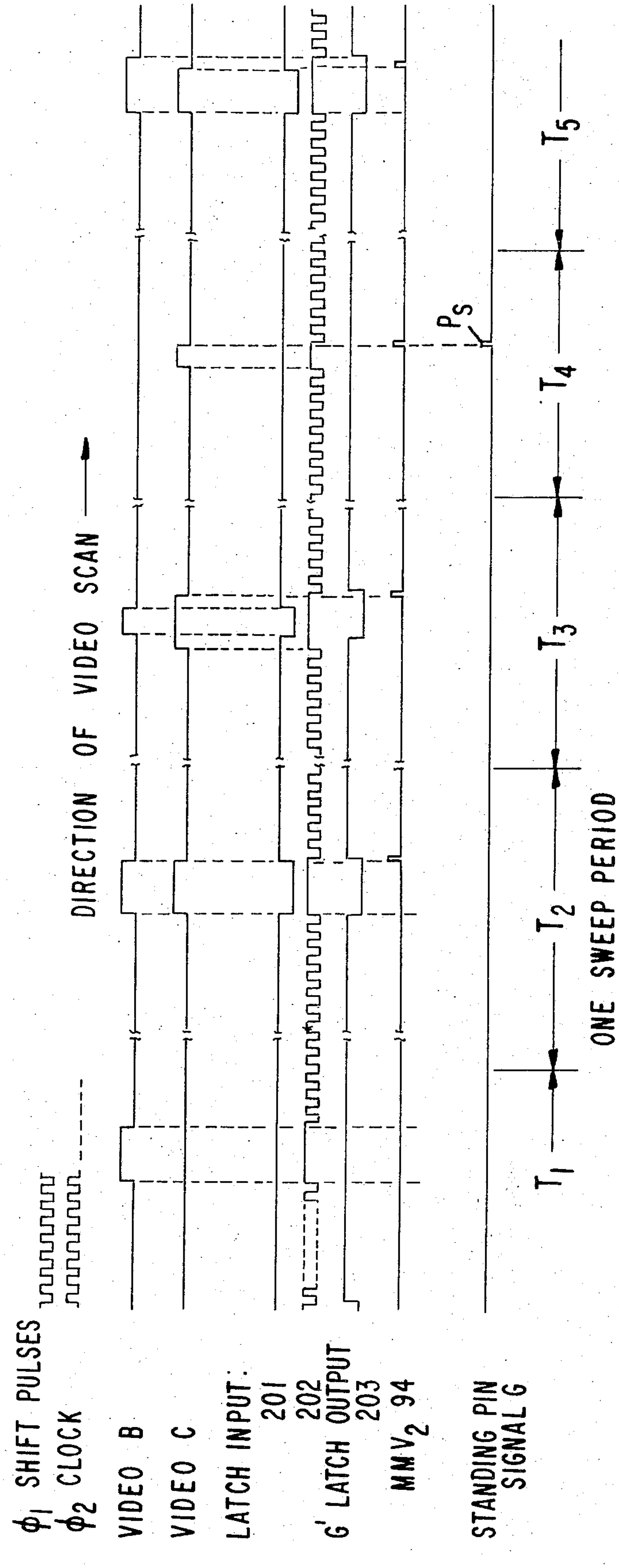

When, the time of occurrence of the pin standing signal $P_s$ of FIG. 11, waveform G, or the corresponding pin standing signal of waveform F, produced by circuit 92 of FIG. 10*a* is coincident with the high one lead 116, then the time coincidence of the pin standing signals with the high of area decoder 300 will not only identify the presence of a standing pin, but will identify that standing pin as the EIGHT PIN. Since the standing pin signal is a relatively narrow pulse, this signal will occur in time coincidence either within the area indicated by decoder 300 or without it and will not occur at both times.

Figure 12B:
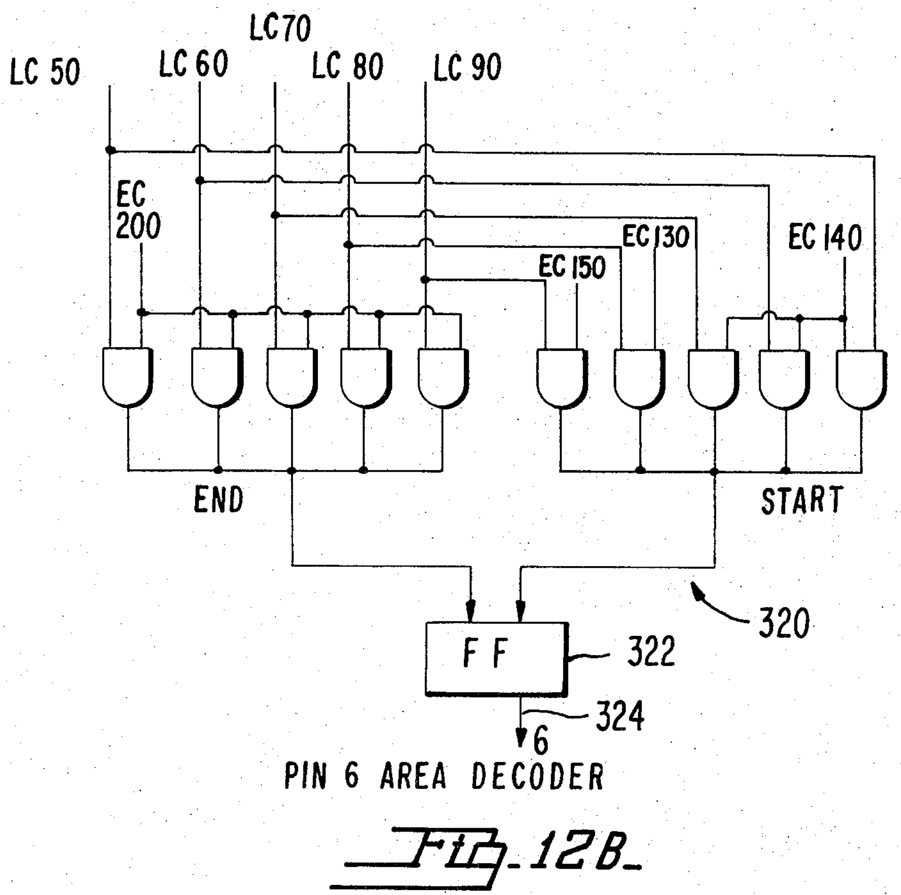

A more complex arrangement is shown in FIG. 12*b* which illustrates the circuit 320 for the pin 6 area decoder. Circuit 320 includes a plurality of AND gates which are grouped into a START and END grouping, as shown. The outputs of the AND gates manifesting the start of a pin area 6 is applied to flip-flop 322 to provide a high on output 324 indicating the presence of pin area 6 at output 324. The high at the other input of flip-flop 322 from the end grouping of AND gates switches the flip-flop to provide a low on output 324 indicating the camera sweep is no longer within pin region identifying area 6. Again selected ones of the outputs of the horizontal element counter and decoder 102 and vertical line counter and decoder 106 are applied to the respective AND gates as shown in FIG. 12*b*. It will be seen here that region 6 has a start y boundary that is broken into three different element counts of 130, 150 and 140, and an end *y* boundary defined by element count 200. The horizontal scan lines are defined by line counts 50, 60, 70, 80 and 90, creating the stepped arrangement as shown in FIG. 3. Output 324 is applied to pin count nd pin identify store 112 along lead 116 such that when a standing pin signal is applied along lead 114 (FIG. 5) in time coincidence therewith, that pin standing signal will be identified as pin number 6.

In a similar manner, circuits (not shown) are provided including a plurality of AND gates whose inputs are coupled to selected ones of the line counts (LC) and element counts (ec) to provide an output signal indicating the start and end of the sweeps intercepting each of the pin identifying regions 1 through 10 of FIG. 3 by way of the corresponding flip-flops for each of the pin identifying regions.

Minimum width discriminator 62 of FIG. 13*a* includes comparator 350 comprising two inverted output OR gates cross coupled as shown. The discriminator input signal A is applied to one shot multivibrator (MMV) 352 and to one of the inputs of compartor 350. One output of MMV 352 is a signal B applied as an input to the other NOR gate of compartor 350. The other output of MMV 352 is a signal $\bar{B}$ which is applied as one input to AND gate 354. Comparator 350 compares the pulse width of signal B to that of signal A. Whenever the signal A pulse width is at least as great as, or greater, then the width of the pulse of signal B, then the output E of comparator 350 will be a high. At all other times the output E will be low. That is compartor 350 compares the time duration of the signal B pulses with the time duration of the video input A pulses. The truth table or the comparator is shown in FIG. 13*c*. It is seen that the output E is high when the input signal A is high and the MMV 352 B output is low. Thus, the time duration of the output signal B of MMV 352 is a signal which defines the minimum pulse width processed by discriminator 62. Signal E enables AND gate 356 which passes to the output thereof the processed video signal $A_1$.

The input video signal A is also applied to inverters 360 and 362 and AND gate 364. The output of inverter 362 is applied to the monostable multivibrator (MMV) 366 which is the same circuit as multivibrator (MMV) 352. The output signal C of MMV 366 has a pulse duration which is the same minimum pulse width of signal B of one shot 352. The other output of MMV 366 is a signal $\bar{C}$. The output of inverter 360 and signal C of MMV 356 are applied as inputs to AND gate 368. Both NAND gates 364 and 368 have inverted outputs which are applied as respective inputs to NOR gate 370 whose output is applied as a second input to AND gate 354.

Examination of the circuitry of FIG. 13*a* indicates that output signal D of AND gate 354 is a pulse whose time duration is identical to the time duration of the pulse of video signal A. Examination of the timing diagram, FIG. 13*b*, indicates that signal B is subtracted from signal A while signal C is added to the signal A to generate signal D. Signal D is passed by AND gate 356 only when E is high, that is, when the width of the pulses in signal A exceeds the width of the pulses in signal B.

Figure 14:
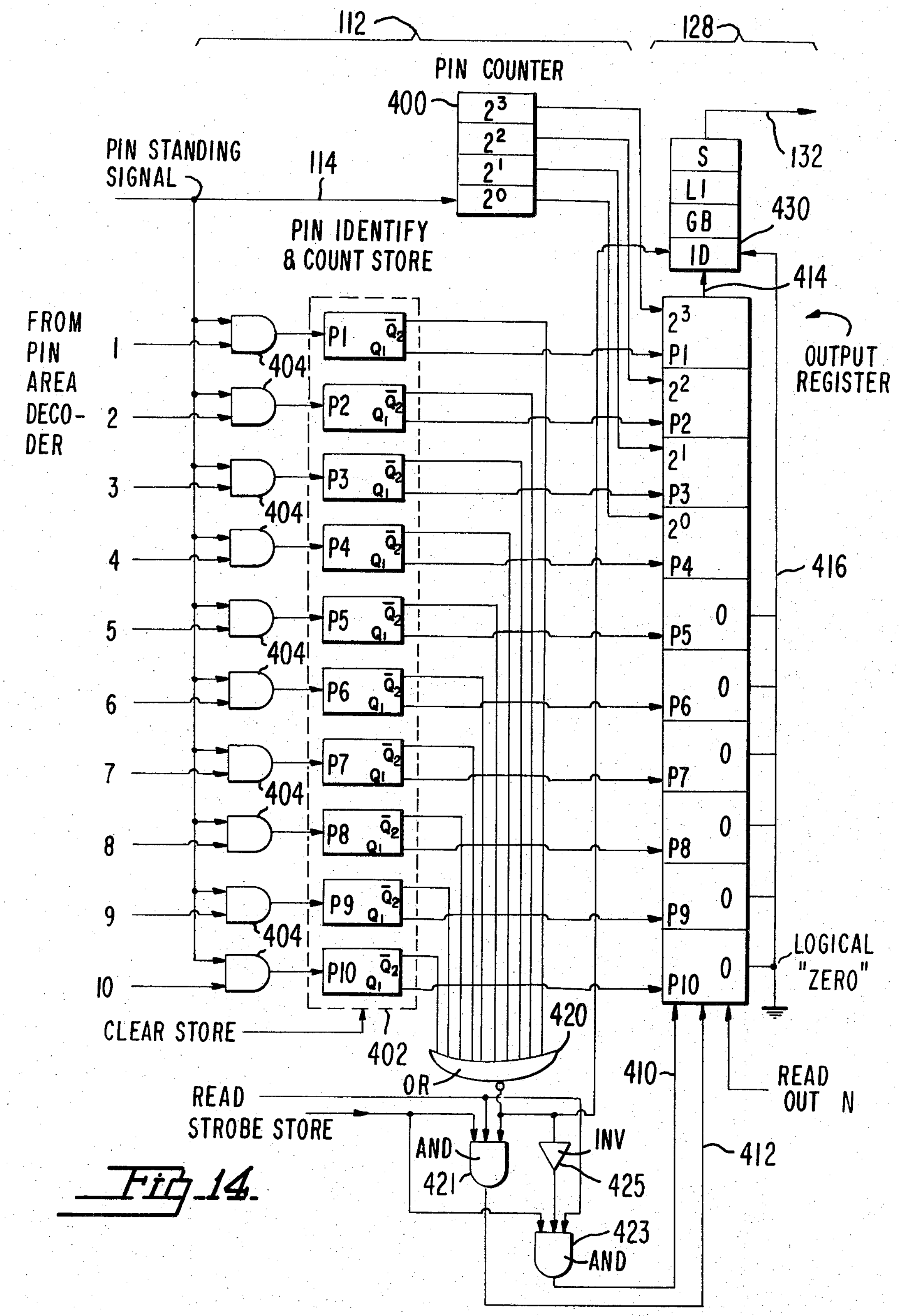

In FIG. 14 there is illustrated a detailed circuit of standing pin determining means 48. Pin count and pin identify store 112 includes pin counter 400 which totalizes all the pin signals occurring within a video frame in binary form as shown. Store 112 also includes a plurality of logic devices 402 p1–p10. Devices 402 p1–p10 hereinafter devices p1–p10 each have an input and two outputs $Q_1$ and $\bar{Q}_2$.

Devices p1–p10 are suitable logical devices arranged to provide given logical output signals on outputs $Q_1$ and $\bar{Q}_2$ in accordance with a sequence of logical signals applied at the input thereto. The truth table for these devices is given in Table I.

Table I

| | Input Count (Sequentially applied) | $Q_1$ | $\bar{Q}_2$ |
|---|---|---|---|
| Cleared state by signal L | 0 | 0 | 1 |
| | 1 | 1 | 1 |
| | 2 | 0 | 0 |
| | 3 | 1 | 0 |

Devices p1–p10 may be provided by connecting dual J-K flip-flops, a commercially available device, having two flip-flops each having a Q and $\bar{Q}$ output. In the drawing the $Q_1$ output refers to the Q output of the first flip-flop and the $\bar{Q}_2$ output refers to the $\bar{Q}$ output of the second flip-flop. The dual flip-flops are connected as a binary counter so that the two Q outputs count the input pulses in binary form. One of the Q outputs thereof will exhibit logical states of the $Q_1$ output of table I. The complement $\overline{Q}$ output of the other Q output will exhibit the logical states of the $\overline{Q}_2$ output of Table I.

Assume the device is reset by signal L and the input and outputs are at the logical states in Table I. Then each successive logical one applied at the input provides the logical output signals noted in Table I corresponding to ordinal position of that input signal.

A separate different AND gate 404 is provided for each of devices 402. The outputs of gates 404 respectively serve as the inputs to the corresponding ones of devices 402. One input to each of gates 404 is applied along a lead connected to lead 114. FIG. 5. A second input to each AND gate 404 is connected to pin area decoder 110 along lead 116 of FIG. 5 and labeled 1 through 10 in FIG. 14. The inputs to each AND gate 404 from decoder 110 is from a different pin region identifying circuit 1-10 exemplified by circuits 300 and 320 of FIGS. 12*a* and 12*b*, respectively, for regions 8 and 6. Other region identifying circuits, not shown, for the remaining pin regions are each connected to the 1–10 input leads of AND gates 404 to regions 1–10, respectively.

When a logical one is received in time coincidence at both inputs of any AND gate 404, the resulting logical one output thereof indicates not only the presence of a standing pin, but also its identification due to the association of the AND gates 404 with the pin identifying regions. Thus, each AND gate 404 is programmed to identify a particular standing pin by the time coincidence of a logical one at both inputs thereto. When an AND gate 404 is enabled, the corresponding device 402 is triggered thereby setting the $Q_1$ and $\overline{Q}_2$ outputs in accordance with table I. A logical one on the $Q_1$ output indicates the presence of a standing pin and, in accordance with which device p1–p10 is triggered, the identity of that standing pin is provided.

Each of the $Q_1$ outputs of devices 402 is applied as a first data input to a respective different register p1–p10 of output register 128. Registers p1–p10 are sequentially arranged in accordance with the pin identification associated therewith. Thus registers p1–p10 are arranged in ascending order by pin identification number with the register nearest register 128 output 132 being register p1. Registers p1–p10 are devices which have two inputs on which data may be entered. The data on only one of these inputs is entered in accordance with a trigger signal on a trigger input corresponding to that data input.

Registers p1–p10 have a serial output 414. Registers p5–p10 have a second common data input 416 connected to ground which corresponds to a logical "zero" voltage level. Registers p1–p4 also respectively have a second data input thereof connected to a separate, different one of the outputs of stages $2^0$–$2^3$ of pin counter 400. Connected to each register p1–p10 are first and second trigger leads 410 and 412 on which signals respectively control whether registers p1–p10 are loaded with first data from devices p1–p10 or with second data from counter 400 and input lead 416. A logical one on lead 410 and a logical zero on lead 412 loads registers p1–p10 with pin standing and identification signals (first data) from devices p1–p10. With a logical zero on lead 410 and a logical one on lead 412 the converse occurs, and data from counter 400 and lead 416 is loaded into registers p1–p10.

A read out signal N applied to register 128 serially shifts the data in registers p1–p10 to output 414.

The $\overline{Q}$ output of each device p1–p10 is connected as an input to NOR gate 420. The output of NOR gate 420 is applied to AND gate 421 whose output is applied to registers p1–p10 via lead 412. The NOR gate 420 output is also applied through inverter 425 to a second AND gate 423 whose output is applied to registers p1–p10 via lead 410. Read signal K and strobe signal M serve as the other inputs to AND gates 421 and 425.

Output 414 is connected as an input to registers 430 of register 128. Registers 430 include an identification register ID, a gutter ball register GB, lane identification register LI and a start register S serially connected to output 132. The signals loaded into the S, LI and GB registers are provided by means (not shown) and serve as identification signals for each of the parameters associated therewith to the central processor (not shown). The ID register indicates whether the information from registers p1–p10 is pin count only or separate pin identification and pin standing signals.

NOR gate 420 has its inverted output connected to the ID register to cause the ID register to indicate whether or not the information forthcoming is pin count or pin identification. When a logical zero is applied to the ID registers from OR gate 420 then ID register provides a logical zero signal on output 132 when called for by signal N indicating that the p1–p10 register signals following are pin standing signals whose identification is determined by the ordinal time position of the pin signals in the shifted output signal. Otherwise a logical one applied to the ID register causes the ID register to indicate the information following is binary pin count only.

Referring to table I, assume as a first example that a pin standing signal is applied to device 402 p1 in time coincidence with a logical one signal from pin region one of area decoder 110 indicating that the one pin is standing. A logical one is applied to device p1 input. The $Q_1$ and $\overline{Q}_2$ outputs are logical ones for device P1. The remaining devices p2–p10 have logical zeros and ones at their respective $Q_1$ and $\overline{Q}_2$ outputs. Devices 402 p1–p10 serve as a memory for these signals until the information therein is read out to registers 128 and cleared by signal L.

Since the $\overline{Q}_2$ output of all the devices p1–p10 are logical ones, NOR gate 420 inverts these to logical zeros. These logical zeros are applied to the AND gate 421 and inverter 425, and ID register. AND gate 421 is disabled by the logical zero input and applies a logical zero along lead 410 to register 128. Inverter 425 applies a logical one to AND gate 432 which is enabled by the time coincidence of strobe signal M and read signal K. AND gate 423 applies a logical one to the enter first data input of registers 128 which then enters the respective data from the $Q_1$ output of devices 402 p1–p10. Since only device p1 received a standing pin signal, and the $Q_1$ output thereof is the only $Q_1$ output of devices 402 at a logical one, then only register p1 will receive a logical one. All other registers p2–p10 receive a logical zero from the first data inputs from corresponding devices p2–p10, respectively.

A read out signal N then causes the data in registers 128 to sequentially shift out to output 132. Since the ID signal is a logical zero, the computer or central processor receiving the pin data from output 132 is told the forthcoming information is pin standing and identification information. The time position of the logical one shifted out indicates that the ONE PIN is standing.

As a second example, assume two logical one signals are received by AND gate 404 for two standing pins in time coincidence with a logical one signal from the THREE PIN area decoder circuit in decoder 110. No other standing pin signals are received by the other devices 402 p1, p2, p4–p10 from AND gates 404 corresponding thereto. The $Q_1$ output of device p3 is a logical zero as is the $\bar{Q}_2$ output as seen in table I. Since $\bar{Q}_2$ is a logical zero, NOR gate 420 inverts this to a logical one. This logical one enables gate 421 and disables gate 423. A logical one is then applied to registers 128 along lead 412 and a logical zero along lead 410. The logical one on lead 412 loads register p1–p4 with binary pin count from corresponding registers in counter 400. Since two standing pins are detected, the 2′ stage of counter 400 registers a logical one which is entered into register p3 from device p3 by the signal on lead 412. Logical zeros are loaded into register p1 to p2, and p4 to p10.

The logical one output of NOR gate 420 is entered in the ID register which tells the computer or processor to examine the forthcoming binary signal as a binary pin count. The time of occurrence of a logical one in the forthcoming sequence indicates the binary pin count as 2′.

Should three pins be detected in the same pin identifying region, it should be clear in view of the above that the same result described for two pins in one region will occur. Statistically, this is a rare event in the bowling game.

In a similar manner, all combinations of pins standing can be counted or identified as the case may be.

FIG. 15 illustrates the construction of one of pin illuminators 22 and 24, which have the same structure so that a description of one serves as a description of both. The illuminator of FIG. 15 includes two elongated supporting frames 500. Secured at one end of frames 500 is front panel 502 having an elongated aperture 504 disposed between frames 500, as shown. Secured to panel 502 on a side thereof opposite frames 500 is collimating lens 506 which is a semi-cylindrical optical member and which serves to collimate the rays of light passing therethrough from between frames 500. At the end of frames 500 opposite panel 502 there is secured U-shaped bracket 510 whose legs are each secured to a separate different frame 500. Bracket 510 has an elongated slit 512 extending between the two legs and arranged so that a ray of light passing therethrough continues through aperture 504 to lens 506, the elongated axis thereof being parallel to the elongated axis of aperture 504 and lens 506 to form an optical path for a relatively thin, fan beam of light rays.

Disposed between bracket 510 and panel 502 is filter 514 which is suitably mounted to bracket 510 such that the light rays passing through slit 512 pass through filter 514 prior to impinging upon lens 504.

A suitable tungsten lamp 516 having an elongated linear tungsten filament 517 which extends parallel and in line with apertures 512, 504 and filter 514 is secured on the other side of bracket 510, as shown. Lamp 516 is mounted in connectors 518 at both ends thereof which are secured to frames 500. Apertures 504 and 512, filament 517 and lens 506 are arranged to generate a collimated beam of light 26 when lamp 516 is turned on. Beam of light 26 is a generally thin, planar beam which has a so-called fan shape.

Means (not shown) mount the illuminator of FIG. 5 to a bowling alley which permit azimuth and height adjustments of the illuminator to aim the beam as described previously herein. Suitable connections, also not shown, connect lamp 516 of each illuminator 22 and 24 to signal generator 54 of FIG. 5. Filter 514 has the same wavelength as an optical filter (not shown) placed in front of the camera lens.

The lamp assembly of FIG. 15 is mounted in a suitable housing on a bowling alley, the location being illustrated in FIGS. 1 and 2. Filter 514 is one which is preferably responsive to light having a wavelength of 650 nanometers. A filter (not shown) is also placed in front of the video camera 20 lens having a similar response as filter 514. Light having a wavelength of shorter length than 650 nanometers will be rejected by filter 514 and light having a greater wavelength will be passed thereby. It has been found that ambient light in a typical bowling alley is substantially reduced when received by camera 20 when filtered at 650 nanometer wavelengths. Substantially all ambient light is filtered out by the filter 514 and the filter (not shown) in front of the camera lens. Thus, the reflected light from the pinheads received by the camera is substantially that generated by illuminators 22 and 24. Any stray light signals are filtered out which might otherwise cause erroneous pin standing signals. As a result, very precise images are generated for each of the pins standing in field of view 30.

It will now be clear that an apparatus for electro-optically detecting and counting the presence of standing pins in a bowling alley constructed and operated in accordance with the present invention has been described which will sense the presence of a standing pin disposed anywhere within a given field of view on a pin deck in a bowling alley.

Additionally, regardless of the configuration of the standing pin array, utilization of photosensitive elements and optics capable of resolving images smaller than the smallest pin image in the field of view in accordance with the present invention provide system sensitivity for all anticipated pin images. The output of the photosensitive elements and optic system is processed to detect and generate a standing pin signal for each standing pin. By scanning the photosensitive elements such as the photosensitive surface of a vidicon with a plurality of sweeps and scans, and dividing the field of view in synchronism with these sweeps and scans, a field of view region identifying signal is generated which provides pin identification for each standing pin. When two or more pin images occur in the same pin identifying region, identification of these pins becomes ambiguous and the apparatus will inhibit the identification of all the detected pins, and will count the total number of standing pins.

What is claimed is:

1. An apparatus for detecting and identifying each of a plurality of standing bowling pins disposed anywhere within a given field of view comprising:

pin detecting means including sweep means for sweeping said field of view to generate a pin standing signal for each standing pin regardless of the position of that pin in said field of view, field of view dividing means for dividing at least a portion of said field of view into a plurality of pin identifying regions and operated in synchronism with said pin detecting means to generate a field of view region identifying signal manifesting each of said regions in accordance with the time position and duration of that region identifying signal with respect to said swept field of view, standing pin determining means responsive to said pin standing signal and said region identifying signal applied as input signals thereto for generating a signal manifesting both the presence and identification of each of said standing pins when the pin standing signal and region identifying signal occur in time coincidence for that pin then being detected, and means for applying said region identifying signal and said pin standing signal as said input signals to said determining means.

2. The apparatus of claim 1 further including inhibit means coupled to said determining means for inhibiting solely the identification of said standing pins when at least two standing pin signals manifesting two separate, different standing pins occur in time coincidence with the region identifying signal corresponding to any of said regions.

3. The apparatus of claim 1 wherein said pin determining means includes counting means responsive to each standing pin signal applied thereto for totaling all the pin standing signals occurring during the sweep of said field of view to generate an output signal manifesting said total count.

4. The apparatus of claim 3 further including inhibit means coupled to said determining means responsive to said pin signals applied thereto or inhibiting solely the identification of said standing pins when at least two standing pin signals manifesting two separate, different standing pins occur in time coincidence with the region identifying signal corresponding to any of said regions.

5. An apparatus for detecting and identifying each of a plurality of standing bowling pins disposed in an array in a given field of view comprising:

pin detecting means including sweep means having a field of view defined by sweeps in one direction and scans in a second direction for generating a pin standing signal manifesting the pins standing within the swept field of view, said sweep means being positioned to receive an image of said given field including said standing pins such that said swept field includes said given field, field of view dividing means for dividing at least a portion of said field of view into a plurality of pin identifying regions and operated in synchronism with each of said sweeps and scans to generate a field of view region identifying signal having a given duration and time position corresponding to each of said regions, said durations and time positions defining the boundaries of said regions along said sweeps and among said scans, standing pin determining means responsive to said pin standing signal and said region identifying signal applied as input signals thereto for generating a signal manifesting the presence and identification of said standing pins when the pin standing signal and a region identifying signal whose duration and time position correspond to one of said regions occur in time coincidence for that pin then being detected, and means for applying said region identifying signal and said pin standing signal as said input signals to said determining means.

6. The apparatus of claim 5 wherein said sweeps intercept the image of said at least on of standing pins in a plurality of scans, said detecting means including comparison means responsive to said pin standing signal applied as an input thereto for comparing to each other the pin standing signals occurring in adjacent sweeps to generate a single standing pin signal for the corresponding single standing pin manifested by said compared signals regardless of the number of scans in which a pin signal manifesting said single standing pin occurs for the pin then being detected.

7. The apparatus of claim 5 wherein a first pin is standing adjacent a second standing pin and are both disposed in one of said regions, said pin determining means including inhibit means responsive to the pin standing signal manifesting said first and second pins and the region identifying signal manifesting said one region applied as input thereto for inhibiting solely the identification of all said standing pins, the two standing pin signals manifestin said first and second standing pins occurring in time coincidence with said one region identifying signal.

8. In an apparatus for detecting each of a plurality of standing bowling pins disposed in a given field of view, the image of at least two of said pins tending to overlap when viewed in said field of view, the combination comprising:

imaging means disposed adjacent said pins for observing said field of view and for providing a separately identifiable pin image for each of said standing pins regardless of the position of said pins in said field of view, scanning means for scanning said imaging means with a plurality of adjacent scans to generate a scan signal manifesting each of said standing pins, said scan signal manifesting at least one of said standing pins in at least two of said adjacent scans, pin detecting means including comparison means responsive to said scan signal applied as an input thereto for comparing the scan signals occurring in adjacent scans to generate a standing pin signal manifesting a single standing pin, and means for applying said scan signal as said input signal to said comparison means.

9. The apparatus of claim 8 wherein said comparison means includes means for comparing the time duration of said scan signals in said adjacent scans.

10. The apparatus of claim 8 wherein said scanning means generates a first signal in a first scan manifesting a standing pin and a second different signal in a second different next adjacent scan manifesting the absence of that standing pin, said comparison means including means for comparing said first and second signals to generate said single standing pin when said first and second signals are present.

11. The apparatus of claim 8 wherein said scanning means generates first, second and third signals in respective separate different next adjacent scans manifesting two standing pins adjacently disposed, said comparison means including means for comparing said first, second and third signals to generate a first single standing pin signal when said first, second and third signals are present.

12. The apparatus of claim 11 wherein said scanning means generates a fourth signal in a separate, different scan manifesting the absence of a standing pin, said comparison means including means for comparing one of said first, second or third signals with said fourth signal to generate a second signal standing pin signal when any of said compared first, second and third signals and said fourth signal are present.

13. An apparatus for detecting each of a plurality of standing bowling pins disposed in an array in a given field of view comprising:

a video camera having a field of view defined by synchronized sweeps in one direction and synchronized scans in a second direction orthogonal to said first direction for generating a first signal manifesting a standing pin disposed within said camera field of view, said camera being positioned such that said camera field of view includes said given field of view, region identifying means operated in synchronism with said sweeps and scans to generate a second signal whose duration and time position define a pin identifying region in said given field of view, standing pin determining means responsive to said first and second signals applied as input signals thereto for generating a signal manifesting the presence of each of said standing pins when said first and second signals occur in time coincidence, and means for applying said first and second signals as said input signals to said pin determining means.

14. An apparatus for detecting each of a plurality of standing bowling pins disposed in an array in a given field of view the combination comprising:

scanning means for scanning an image of said field with a plurality of scans in a first direction, each scan of said scanning means generating a signal including a pulse manifesting each standing pin image intercepted by that scan, the time position of said pulse in that scan corresponding to a predetermined pin identification, field of view dividing means synchronized with said scanning means for generating an output signal manifesting a field of view time position element along each scan, the time position element of each scan corresponding to respective like time position elements in each of the other scans, region grouping means synchronized with said scanning means and said dividing means for generating a field of view region identifying signal for selected ones of said scans and time position elements, comparison means for comparing the scan signal of at least two adjacent scans to each other such that like time position elements of each compared scan signal occur in time coincidence during said comparing, said comparing means generating a pin standing signal when said pulse is present in only one of said compared scans during each of said comparisons, standing pin determining means responsive to said region identifying signal and said pin indicating signal for generating a standing pin identification signal when said region identifying signal and said pin standing signal occur in time coincidence, and means for applying said region identifying signal and said pin standing signal as input signals to said pin determining means.

15. The apparatus of claim 14 wherein at least two adjacent standing pins have overlapping pin images, the generated pulse manifesting the interface of said overlapping pin images having a different time duration than said standing pin pulse duration, said comparison means including means for comparing the time duration of at least three pulses generated in like time positions in three respective separate, different adjacent scans for generating a pin standing signal only when the three compared pulses each have a corresponding given time duration.

16. In an apparatus for detecting each of a plurality of standing bowling pins disposed in an array in a given field of view the combination comprising:

a plurality of signal generating elements responsive to a received image for generating an output signal when said image impinges thereon, said elements being sized and spaced in said field of view such that at least two of said elements are simultaneously responsive to separate, different portions of the same received image of any of said pins when standing, each element generating said output signal as a pin signal for that image then impinging thereon, and standing pin detecting means responsive to each said generating pin signal applied thereto as an input signal for combining those pin signals manifesting the same standing pin to generate as an output thereof a standing pin signal manifesting a single standing pin corresponding to said same standing pin.

17. The combination of claim 16 wherein said elements are disposed in a plurality of rows and columns defining said field of view, said standing pin signal generating means including means for combining the outputs of each said elements such that a standing pin signal manifesting a standing pin is generated for each standing pin image impinging thereon in each row, and means for comparing combined element output signals applied thereto in like columns in next adjacent rows to generate said single standing pin signal only when the output signals in the compared rows manifest a given portion of said image.

18. The combination of claim 17 wherein said standing pin signal generating means includes means responsive to said received image for simultaneously comparing the output signals produced in two next adjacent rows, said single standing pin signal being generated when said compared output signals manifest the same given edge for each received image of said standing pins.

19. The combination of claim 17 wherein the pin images of at least two pins overlap, said standing pin signal generating means includes means responsive to said received image for comparing the output signals in three next adjacent rows, said single standing pin signal being generated when said compared output signals of said compared rows manifest a given portion of said overlapping images.

20. In combination:

imaging means positioned to observe a given field of view including a plurality of bowling pins standing in said field of view for producing an image of said field of view including said standing pins, the image of said standing pins having a given configuration, illuminating means for illuminating said pins such that said imaging means provides a separately identifiable pin image for each said standing pin, and single pin detecting means positioned to receive said produced image for detecting the presence of said pins and including first image comparison means responsive to said received image for comparing first and second contiguous portions of said received image to generate a pin standing signal manifesting each of said standing pins when a given portion of the image of that pin then being detected is manifested in said compared first and second portions.

21. The combination of claim 20 wherein a second pin is standing in said field of view whereby the received given portion of the image of said second pin is contiguous to the received image of said one pin such that said single pin detecting means detects the presence of only one of said contiguous standing pins, said combination further including adjacent pin detecting means positioned to receive said produced image including second image comparison means responsive to said last-mentioned received image for comparing third, fourth and fifth portions of said last mentioned received image, said third portion being contiguous to said fourth portion, said fourth portion being contiguous to said fifth portion, said comparison means generating a pin standing signal manifesting said second pin only when said third, fourth and fifth portions manifest the interface of said contiguous images.

22. The combination of claim 20 wherein said bowling pins each include a head portion and a body portion, said being means arranged to generate a fan beam of light and positioned to illuminate solely the tops of the respective head portions so that said produced image comprises substantially said illuminated tops.

23. The combination of claim 20 further including field of view dividing means arranged to divide said field of view into a plurality of pin identifying regions, said pins each being identified in accordance with the pin identifying region in which the pin image for that pin occurs, said dividing means generating a region identifying signal manifesting each of said divided regions, and standing pin determining means responsive to said pin standing signal and said region identifying signal applied as input signals thereto programmed to correlate said pin-standing signal to one of said pin identifying regions manifested by said region identifying signal when a pin image occurs in said one identifying region.

24. In combination:

Illuminating means for simultaneously illuminating solely the same given portion of each standing pin of a bowling game disposed anywhere in a given field of view, said illuminated portion providing a separately, identifiable pin image for each standing pin, and pin detecting means disposed to receive the images of said illuminated pin portions and responsive to said received images for detecting the presence of each pin standing in said field of view area regardless of the pin position in said area to generate a standing pin signal for each said standing pin.

25. The combination of claim 24 further including standing pin identifying means coupled to said pin detecting means for generating a pin identifying signal for each standing pin detected by said detecting means in accordance with the pin position of the detected pin standing in said field of view.

26. The combination of claim 24 wherein said same given portion is the tops of said pins.

27. The combination of claim 24 wherein said illuminating means includes means for producing a fan beam of illuminating rays across said field of view.

28. An apparatus for detecting and identifying each of a plurality of standing bowling pins disposed in an array in a given field of view comprising:

pin detecting means including sweep means for sweeping said field of view to generate a pin standing signal for each pin standing in said field of view, field of view dividing means for dividing at least a portion of said field of view into a plurality of pin identifying regions and operated in synchronism with said pin detecting means to generate a field of view region identifying signal manifesting each of said regions in accordance with the time position and duration of that region identifying signal with respect to said swept field of view, standing pin determining means responsive to said pin standing signal and said region identifying signal applied as input signals thereto for generating a signal manifesting both the presence and identification of each of said standing pins when the pin standing signal and region identifying signal occur in time coincidence for that pin then being detected, means for applying said region identifying signal and said pin standing signal as said input signals to said determining means, and inhibit means coupled to said determining means for inhibiting solely the identification of said standing pins when at least two standing pin signals manifesting two separate, different standing pins occur in time coincidence with the region identifying signal corresponding to any of said regions.

29. An apparatus for detecting and identifying each of a plurality of standing bowling pins disposed in an array in a given field of view comprising:

pin detecting means including sweep means for sweeping said field of view to generate a pin standing signal for each pin standing in said field of view, field of view dividing means for dividing at least a portion of said field of view into a plurality of pin identifying regions and operated in synchronism with said pin detecting means to generate a field of view region identifying signal manifesting each of said regions in accordance with the time position and duration of that region identifying signal with respect to said swept field of view, standing pin determining means responsive to said pin standing signal and said region identifying signal applied as input signals thereto for generating a signal manifesting both the presence and identification of each of said standing pins when the pin standing signal and region identifying signal occur in time coincidence for that pin then being detected, said pin determining means including counting means responsive to each standing pin signal applied thereto for totaling all the pin standing signals occurring during the sweep of said field of view to generate an output signal manifesting said total count, inhibit means coupled to said determining means responsive to said pin signals applied thereto for inhibiting solely the identification of said standing pins when at least two standing pin signals manifesting two separate, different standing pins occur in time coincidence with the region identifying signal corresponding to any of said regions, and means for applying said region identifying signal and said pin standing signal as said input signals to said determining means.

30. An apparatus for detecting each of a plurality of standing bowling pins set in an array in a given field of view, the combination comprising:

scanning means for scanning said field of view with a plurality of adjacent scans to generate a scan signal manifesting each of said standing pins each of which correspond to a different given time position in said field of view, said scan signal manifesting at least one of said standing pins in at least two of said adjacent scans, pin detecting means including comparison means responsive to said scan signal applied as an input thereto for comparing the scan signals occurring in adjacent scans and occurring in the same time position in said field of view to generate a standing pin signal manifesting a signal standing pin regardless the number of scans in which a scan signal manifesting said single standing pin occurs for the pin then being detected, said scanning means generating first, second and third signals in respective, separate, different next adjacent scans manifesting two standing pins adjacently disposed, said comparison means inclduing means for comparing said first, second and third signals to generate a first single standing pin signal when said first, second and third signals are present, said scanning means generating a fourth signal in a separate, different scan manifesting the absence of a standing pin, said comparison means including means for comparing one of said first, second or third signals with said fourth signal to generate a second single standing pin signal when any of said compared first, second and third signals and said fourth signal are present, and means for applying said scan signal as said input signal to said comparison means.

31. In an apparatus for detecting each of a plurality of standing bowling pins disposed in an array in a given field of view the combination comprising:

a plurality of signal generating elements responsive to a received image for generating an output signal when said image impinges thereon, said elements being sized and spaced in said field of view such that at least two of said elements are simultaneously responsive to separate, different portions of the same received image of any of said pins when standing, each element generating said output signal as a pin signal for that image then impinging thereon, standing pin detecting means responsive to each said generated pin signal applied thereto as an input signal for combining said pin signals manifesting the same standing pin to generate as an output thereof a standing pin ignal manifesting a single standing pin, field of view dividing means coupled to said elements for grouping said elements into a plurality of separate, different pin identifying regions and for generating a region identifying signal for each region, each pin in said array being identified in accordance with the region in which the pin image for that pin is disposed, and means responsive to said standing pin signal and said region identifying signal applied as inputs thereto for generating a pin standing and identification signal for a standing pin disposed in one of said regions.

32. In combination:

imaging means positioned to observe a given field of view including first and second bowling pins standing in said field of view for producing an image of said field of view including said standing pins, the image of each said standing pins having a given configuration, single pin detecting means positioned to receive said produced image for detecting the presence of said first pin and including first image comparison means responsive to said received image for comparing first and second contiguous portions of said received image to generate a pin standing signal manifesting said first standing pin when a given portion of the image of that first pin is manifested in said compared first and second portions, said second pin standing in said field of view whereby the received given portion of the image of said second pin is contiguous to the received image of said first pin such that said single pin detecting means detects the presence of only said first standing pin, and adjacent pin detecting means positioned to receive said produced image including second image comparison means responsive to said last-mentioned received image for comparing third, fourth and fifth portions of said last-mentioned received image, said third portion being contiguous to said fourth portion, said fourth portion being contiguous to said fifth portion, said comparison means generating a pin standing signal manifesting said second pin only when aid third, fourth and fifth portions manifest the interface of said contiguous images.

33. In combination:

imaging means positioned to observe a given field of view including at least one bowling pin standing in said field of view for producing an image of said field of view including said one standing pin, the image of said standing pin having a given configuration, single pin detecting means positioned to receive said produced image for detecting the presence of said one pin and including first image comparison means responsive to said received image for comparing first and second contiguous portions of said received image to generate a pin standing signal manifesting said one standing pin when a given portion of the image of that one pin is manifested in said compared first and second portions, field of view dividing means arranged to divide said field of view into a plurality of pin identifying regions, said one pin being identified in accordance with the pin identifying region in which said one pin image occurs, said dividing means generating a region identifying signal manifesting each of said divided regions, and standing pin determining means responsive to said pin standing signal and said region identifying signal applied as input signals thereto programmed to correlate said pin standing signal to one of said pin identifying regions manifested by said region identifying signal when said one pin image occurs in said one identifying region.

* * * * *